(12) United States Patent
Ito et al.

(10) Patent No.: US 11,258,845 B2
(45) Date of Patent: Feb. 22, 2022

(54) BROWSER MANAGEMENT SYSTEM, BROWSER MANAGEMENT METHOD, BROWSER MANAGEMENT PROGRAM, AND CLIENT PROGRAM

(71) Applicant: ValueCommerce Co., Ltd., Tokyo (JP)

(72) Inventors: Nobutaka Ito, Tokyo (JP); Masafumi Tsuru, Tokyo (JP)

(73) Assignee: VALUECOMMERCE CO., LTD., Tokyo (JP)

( * ) Notice: Subject to any disclaimer, the term of this patent is extended or adjusted under 35 U.S.C. 154(b) by 0 days.

(21) Appl. No.: 17/256,399

(22) PCT Filed: Jul. 5, 2018

(86) PCT No.: PCT/JP2018/025568
§ 371 (c)(1),
(2) Date: Dec. 28, 2020

(87) PCT Pub. No.: WO2020/008600
PCT Pub. Date: Jan. 9, 2020

(65) Prior Publication Data
US 2021/0120074 A1    Apr. 22, 2021

(51) Int. Cl.
*H04L 29/08*     (2006.01)
*G06F 16/957*    (2019.01)
*G06F 16/958*    (2019.01)
*G06F 40/103*    (2020.01)
(Continued)

(52) U.S. Cl.
CPC .......... *H04L 67/06* (2013.01); *G06F 16/958* (2019.01); *G06F 16/9574* (2019.01); *G06F 40/103* (2020.01); *H04L 67/02* (2013.01)

(58) Field of Classification Search
None
See application file for complete search history.

(56) References Cited

U.S. PATENT DOCUMENTS

| | | | |
|---|---|---|---|
| 9,055,384 B2 * | 6/2015 | Ivanchenko | G06K 9/3258 |
| 9,369,545 B2 * | 6/2016 | Kembel | G06F 3/0481 |
| 9,942,299 B2 * | 4/2018 | Wei | H04L 67/02 |

(Continued)

FOREIGN PATENT DOCUMENTS

| | | |
|---|---|---|
| JP | 2006-113884 A | 4/2006 |
| JP | 4647717 B2 | 3/2011 |

(Continued)

OTHER PUBLICATIONS

International Preliminary Report on Patentability with translation of Written Opinion dated Jan. 5, 2021 in International Application No. PCT/JP2018/025568.

(Continued)

*Primary Examiner* — Davoud A Zand
(74) *Attorney, Agent, or Firm* — Sughrue Mion, PLLC

(57) ABSTRACT

A browser management system according to one embodiment includes at least one processor. The at least one processor is configured to: (A) in response to processing for displaying a webpage on a browser of a user terminal, generate a data sequence for identifying the browser; (B) generate an image file including a plurality of pixels representing the data sequence; and (C) transmit the image file to the user terminal in order to store the data sequence into a cache of the user terminal.

8 Claims, 17 Drawing Sheets

(51) Int. Cl.
*H04L 67/06* (2022.01)
*H04L 67/02* (2022.01)

(56) References Cited

U.S. PATENT DOCUMENTS

| | | | | |
|---|---|---|---|---|
| 10,686,781 B1* | 6/2020 | Kaditz | .................. | H04W 12/06 |
| 2002/0032027 A1* | 3/2002 | Kirani | ..................... | G06T 9/007 |
| | | | | 455/412.1 |
| 2003/0095135 A1* | 5/2003 | Kaasila | ................. | G06T 11/203 |
| | | | | 345/613 |
| 2008/0177994 A1* | 7/2008 | Mayer | ................... | G06F 9/4418 |
| | | | | 713/2 |
| 2012/0054143 A1* | 3/2012 | Doig | .................. | G06Q 30/0269 |
| | | | | 706/47 |
| 2013/0272394 A1* | 10/2013 | Brockmann | .............. | G06T 9/00 |
| | | | | 375/240.12 |
| 2013/0304604 A1* | 11/2013 | Hoffman | ............ | G06Q 30/0621 |
| | | | | 705/26.5 |
| 2016/0026730 A1* | 1/2016 | Hasan | ................... | G06F 40/143 |
| | | | | 715/234 |
| 2017/0221121 A1* | 8/2017 | Davis | ................ | G06Q 30/0627 |

FOREIGN PATENT DOCUMENTS

| | | |
|---|---|---|
| JP | 2014-130542 A | 7/2014 |
| JP | 2014-241114 A | 12/2014 |

OTHER PUBLICATIONS

International Search Report for PCT/JP2018/025568, dated Oct. 9, 2018.

* cited by examiner

BROWSER MANAGEMENT SYSTEM, BROWSER MANAGEMENT METHOD, BROWSER MANAGEMENT PROGRAM, AND CLIENT PROGRAM

CROSS REFERENCE TO RELATED APPLICATIONS

This application is a National Stage of International Application No. PCT/JP2018/025568 filed Jul. 5, 2018.

TECHNICAL FIELD

One aspect of the present invention relates to a browser management system, a browser management method, a browser management program, and a client program.

BACKGROUND ART

A framework is known that manages a browser of a user terminal. For example, Patent Literature 1 discloses a method of tracking a user's activity by using a tracking server site. In a first process of this method, when a banner advertisement is clicked on in a user terminal, the tracking server site creates cookie data based on click information and transmits it to the user terminal. In a second process, an advertiser's site receives the cookie data from the user terminal, and writes a cookie to the user terminal based on the cookie data. In a third process, the advertiser's site acquires the cookie from the user terminal upon completion of electronic commerce, and creates a tracking telegram including recording information of this cookie and transmits it to the tracking server site.

CITATION LIST

Patent Literature

PTL1: JP 4647717 B

SUMMARY OF INVENTION

Technical Problem

The technique disclosed in Patent Literature 1 assumes the use of an HTTP cookie. However, since there is an environment where an HTTP cookie is unavailable, it is desirable to identify a browser by a method other than an HTTP cookie.

Solution to Problem

A browser management system according to one aspect of the present invention includes at least one processor, the at least one processor is configured to: in response to processing for displaying a webpage on a browser of a user terminal, generate a data sequence for identifying the browser; generate an image file including a plurality of pixels representing the data sequence; and transmit the image file to the user terminal in order to store the data sequence into a cache of the user terminal.

A browser management method according to one aspect of the present invention is a browser management method performed by at least one processor, including: in response to processing for displaying a webpage on a browser of a user terminal, generating a data sequence for identifying the browser; generating an image file including a plurality of pixels representing the data sequence; and transmitting the image file to the user terminal in order to store the data sequence into a cache of the user terminal.

A browser management program according to one aspect of the present invention causes a computer system to perform: in response to processing for displaying a webpage on a browser of a user terminal, generating a data sequence for identifying the browser; generating an image file including a plurality of pixels representing the data sequence; and transmitting the image file to the user terminal in order to store the data sequence into a cache of the user terminal.

According to the above-described aspects, an image file representing a data sequence for identifying a browser is stored in a cache of a user terminal. By using this image file, the browser can be identified without using an HTTP cookie.

Advantageous Effects of Invention

According to one aspect of the present invention, a browser is identified by a method other than an HTTP cookie.

DESCRIPTION OF EMBODIMENTS

An embodiment of the present invention is described hereinafter with reference to the attached drawings. Note that, in the description of the drawings, the same or similar elements are denoted by the same reference symbols and redundant description thereof is omitted.

[Overview of System]

In several embodiments, a browser management system is a computer system that provides a framework for identifying a browser of a user terminal. This browser management system enables implementation of stateful processing on a computer system using a stateless protocol.

"Stateless" is a technique where a system does not hold data indicating the current state. An example of a stateless protocol is HTTP (Hypertext Transfer Protocol), though not limited thereto. On the other hand, "stateful" is a technique where a system holds data indicating the current state, and this state is reflected on processing.

Various services are achieved by stateful processing. Examples of the services include electronic commerce (EC), conversion tracking, affiliate tracking, analytics, targeting, and measures against unauthorized access. Note that, however, types of services involving stateful processing are not limited thereto. The browser management system may be built for any service.

In order to implement stateful processing, the browser management system does not use an HTTP cookie, which is known in related art, but uses a new technique different from that related art. To be specific, the browser management system transmits an image file in which a data sequence for identifying a browser (which is hereinafter also referred to simply as "data sequence") is embedded (which is hereinafter also referred to simply as "image file") to a user terminal and thereby stores this data sequence in the user terminal. This data sequence is used for implementing stateful processing. The browser management system according to the present disclosure is described hereinafter in detail by using several embodiments as examples.

First Embodiment

Figure 1:
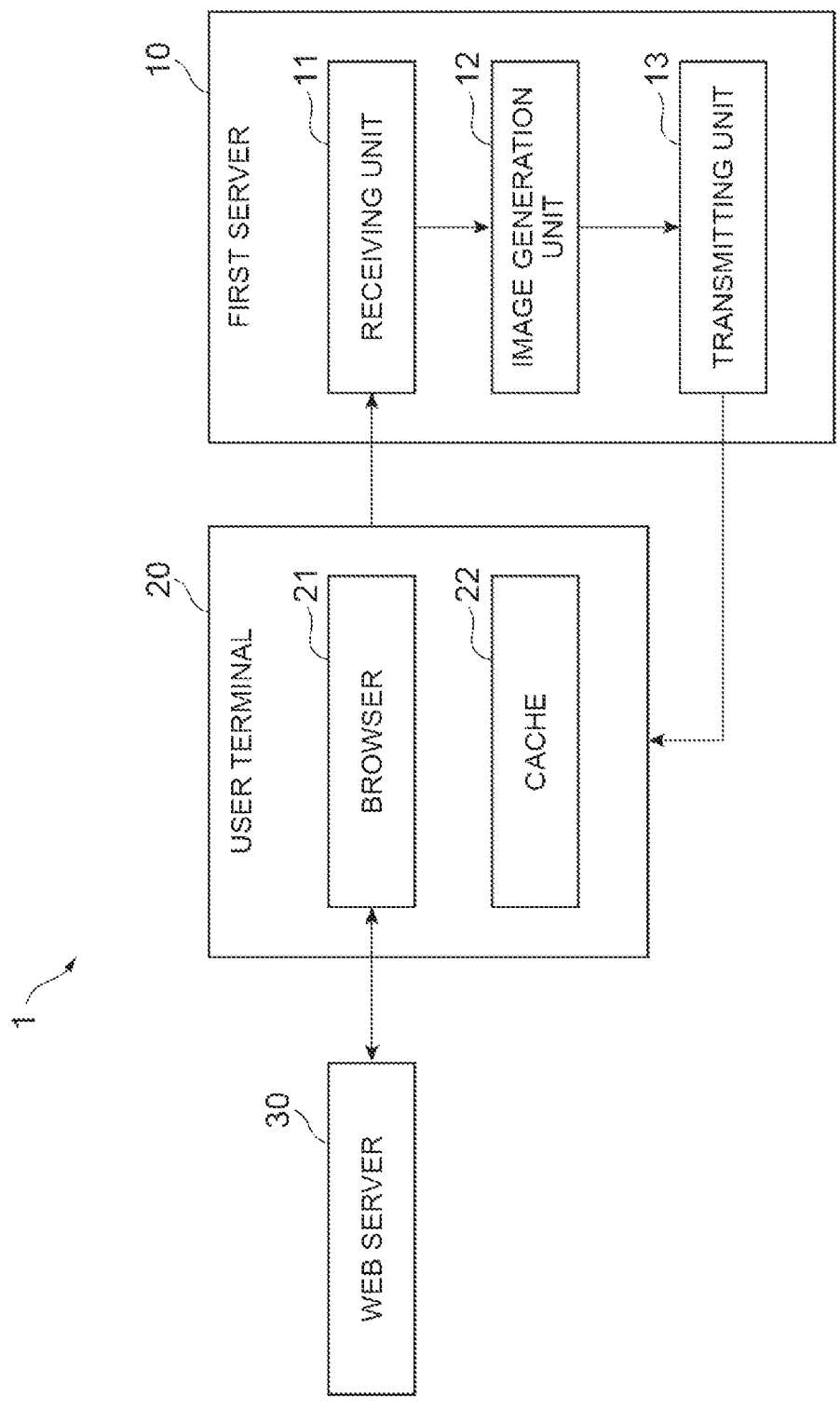
FIG. 1 is a view showing an example of the functional configuration of a browser management system according to a first embodiment.

FIG. 1 is a view showing an example of the functional configuration of a browser management system 1 according to a first embodiment. In this embodiment, the browser management system 1 includes a first server 10. The first server 10 is connectable to one or more user terminals 20 through a communication network. In this embodiment, the user terminal 20 is also contactable to a web server 30 through a communication network. The configuration of the communication network that connects computers is not particularly limited. For example, the communication network may be built using at least one of the Internet and an intranet.

The user terminal 20 is a computer that is operated by a user who receives an arbitrary online service. The user terminal 20 includes a browser 21 and a cache 22. The browser 21 is software for displaying a webpage on a monitor. The user terminal 20 may include a plurality of types of browsers. The cache 22 is a function of temporarily storing data in a computer. A method of implementing the cache 22 is not limited, and the cache 22 may be implemented using a cache memory, a disk cache, or a cache file, for example. The type of a computer to be used as the user terminal is not limited. For example, the user terminal may be a portable or stationary personal computer. Alternatively, the user terminal may be a mobile terminal such as an advanced mobile phone (smart phone), a cellular phone, a personal digital assistant (PDA), or a tablet.

The web server 30 is a computer that provides the user terminal 20 with a website capable of providing a stateful service (which is hereinafter referred to simply as "website"). A website is a set of one or more webpages under a certain domain name. A webpage is a document in one page that is viewable in a browser. Examples of websites include an EC site, a news site, a portal site, a blog site, a social networking service (SNS) site and the like. Note that, however, examples of websites are not limited thereto. Since websites are not particularly limited, the content of each webpage (for example, information placed or functions available on the webpage) is also not particularly limited.

The first server 10 is a computer that performs processing for identifying the browser 21 of the user terminal 20. To be specific, the first server 10 transmits an image file in which a data sequence is embedded to the user terminal 20. The first server 10 includes a receiving unit 11, an image generation unit 12, and a transmitting unit 13 as functional elements. The receiving unit 11 is a functional element that receives a request for an image file from the user terminal 20 that processes a webpage. The image generation unit 12 is a functional element that generates an image file in which a data sequence is embedded, in response to that request. The transmitting unit 13 is a functional element that transmits this image file to the user terminal 20 in order to store the data sequence into the cache 22.

The first server 10 is composed of one or a plurality of computers. In the case of using a plurality of computers, those computers are connected through a communication network such as the Internet or an intranet, and thereby logically one first server 10 is built.

Figure 2:
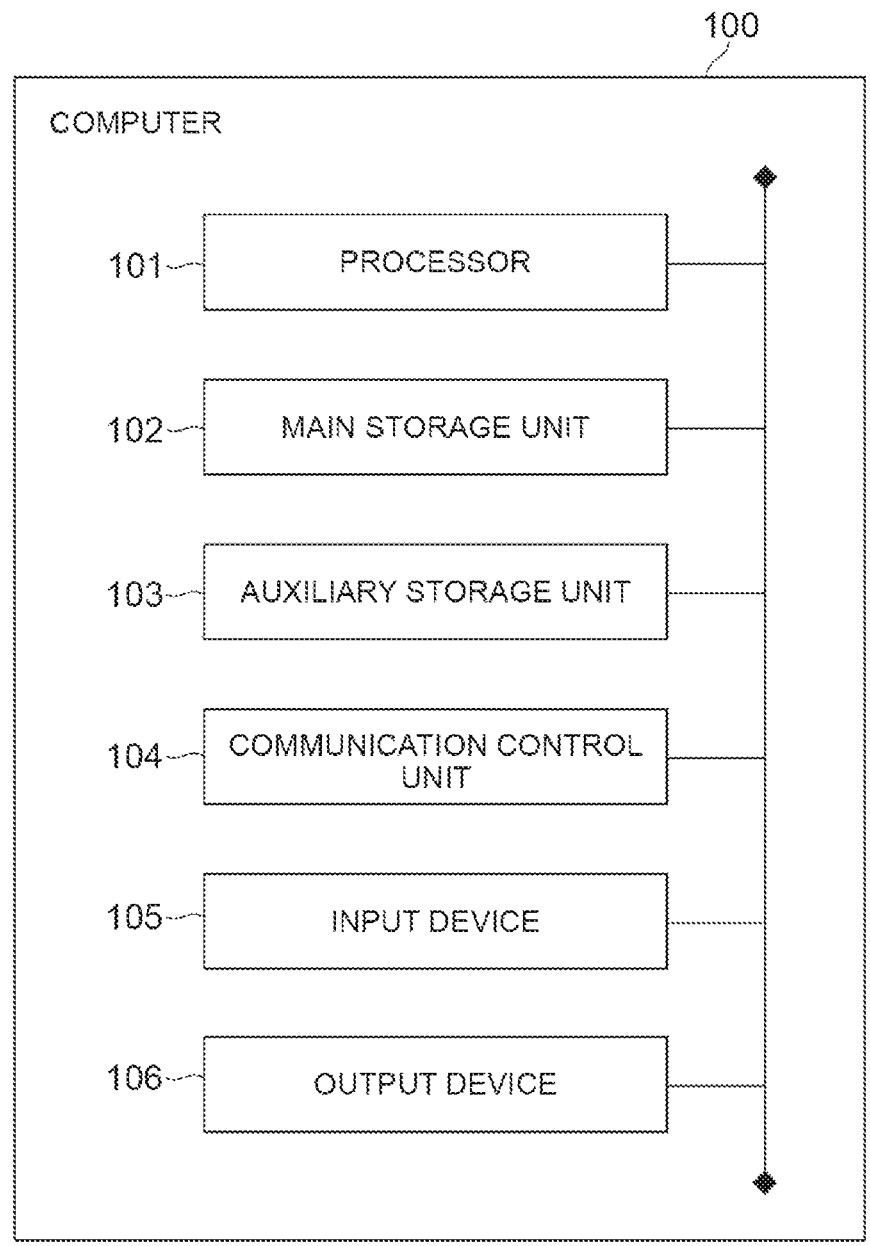
FIG. 2 is a view showing a typical hardware configuration of a computer used in a browser management system according to an embodiment.

FIG. 2 is a view showing a typical hardware configuration of a computer 100 that constitutes the first server 10. For example, the computer 100 includes a processor 101, a main storage unit 102, an auxiliary storage unit 103, a communication control unit 104, an input device 105, and an output device 106. The processor 101 runs an operating system and an application program. The main storage unit 102 is ROM and RAM, for example. The auxiliary storage unit 103 is a hard disk or a flash memory, for example, and it generally stores a larger volume of data than the main storage unit 102. The auxiliary storage unit 103 stores a first program causing at least one computer to function as the first server 10. The communication control unit 104 is a network card or a wireless communication module, for example. The input device 105 is a keyboard, a mouse, a touch panel or the like, for example. The output device 106 is a monitor and a speaker, for example.

The functional elements of the first server 10 are implemented by loading the first program onto the processor 101 or the main storage unit 102 and running this program. The first program includes codes for implementing the functional elements of the first server 10. The processor 101 makes the communication control device 104, the input device 105 or the output device 106 operate in accordance with the first program, and reads and writes data to and from the main storage unit 102 or the auxiliary storage unit 103. The functional elements of the first server 10 are implemented by this processing. Data or databases required for the processing may be stored in the main storage unit 102 or the auxiliary storage unit 103.

The first program may be provided in the form of being recorded in a static manner on a tangible recording medium such as a CD-ROM, a DVD-ROM or a semiconductor memory, for example. Alternatively, the first program may be provided as a data signal superimposed onto a carrier wave through a communication network. The provided first program may be stored in the auxiliary storage unit 103.

Although the first server 10 is a computer that is different from the web server 30 in this embodiment, the configuration of the server is not limited thereto. For example, one server may include the functions of both of the first server 10 and the web server 30.

Figure 3:
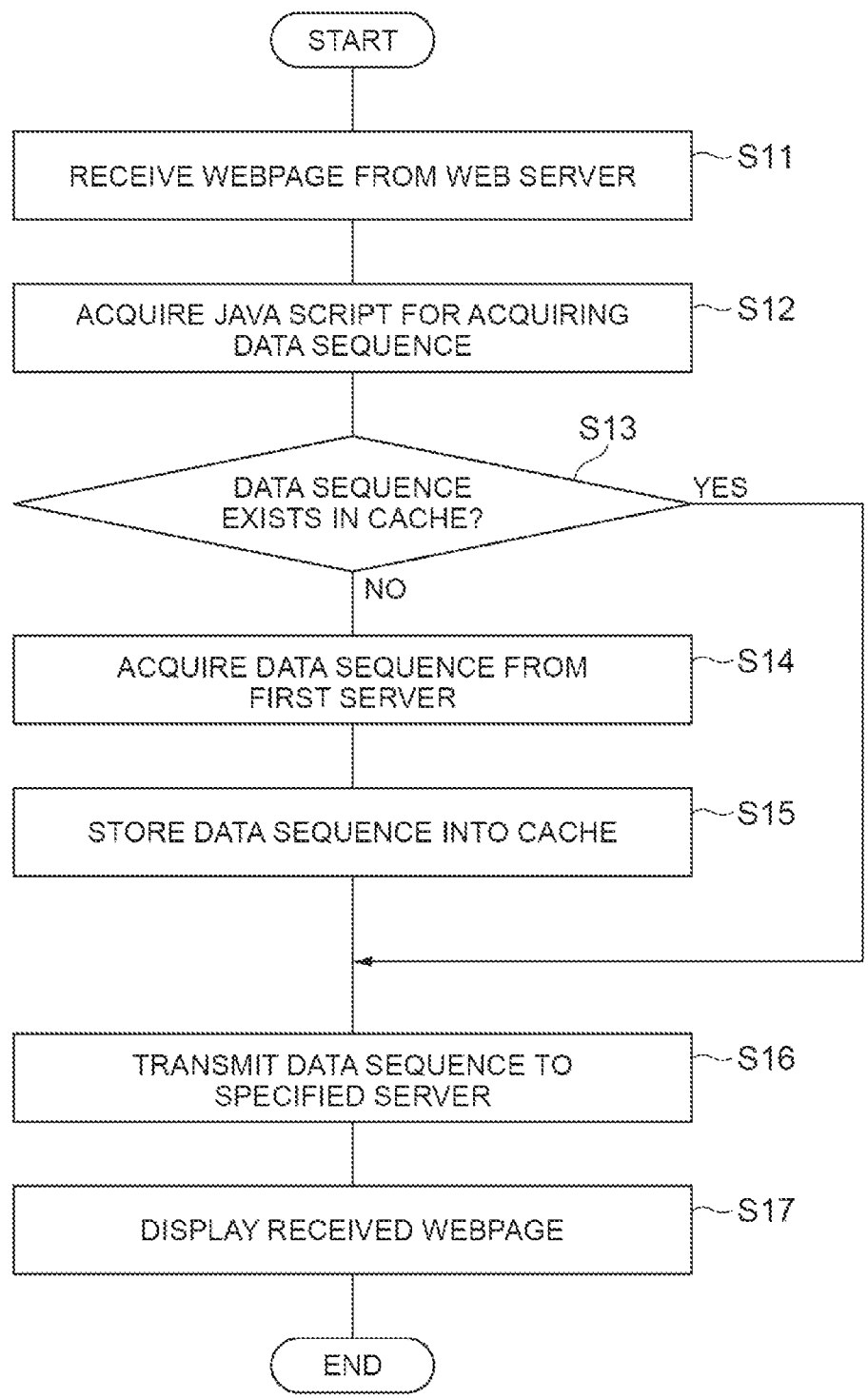
FIG. 3 is a flowchart showing an example of the operation of a user terminal.

Processing in the user terminal 20 related to acquisition of a data sequence is described hereinafter with reference to FIG. 3. FIG. 3 is a flowchart showing an example of the operation of the user terminal 20.

In Step S11, in response to a user's selection of a webpage of a website, the user terminal 20 receives this webpage from the web server 30. A method of selecting a webpage is not particularly limited. For example, a webpage may be selected by clicking on a link or may be selected by directly entering a URL (Uniform Resource Locator).

In Step S12, the user terminal 20 acquires JavaScript (registered trademark) for acquiring a data sequence. For example, the user terminal 20 acquires a script according to a <script> tag described in the received webpage. A script is a relatively simple program to run on the browser 21. The user terminal 20 runs the script to execute the subsequent steps (for example, at least some of Steps S13 to S17). Note that the script is not limited to JavaScript (registered trademark), and another script language may be used.

In Step S13, the user terminal 20 checks whether a data sequence corresponding to the website is stored in the cache 22. When the data sequence already exists in the cache 22 (Yes in Step S13), there is no need to newly acquire the data sequence, and therefore the user terminal 20 does not make a request for the data sequence to the first server 10. On the other hand, when the data sequence does not exist in the cache 22 (No in Step S13), the process proceeds to Step S14.

In Step S14, the user terminal 20 acquires the data sequence corresponding to the website from the first server 10. The user terminal 20 acquires the data sequence by receiving from the first server 10 an image file in which the data sequence is embedded.

In Step S15, the user terminal 20 stores this data sequence into the cache 22. The user terminal 20 may store the image file into the cache 22. Since the image file includes the data sequence, storing of the image file is one example of storing of the data sequence. Alternatively, the user terminal 20 may extract the data sequence from the image file and store this data sequence into the cache 22. As a result that the data sequence is stored in the cache 22, the user terminal 20 can transmit this data sequence to the server side (network side). The server that receives the request acquires this data sequence and can thereby perform processing based on the current state of the browser 21, which enables implementation of stateful processing.

In Step S16, the user terminal 20 reads the data sequence from the cache 22 and transmits this data sequence to a specified server. The data sequence may be transmitted to any type of server, and it may be any one of a redirect server, a beacon server, and the web server 30, for example.

In Step S17, the user terminal 20 displays the received webpage on a monitor.

Steps S11 to S17 are processing to display the webpage on the browser 21 of the user terminal 20. To execute this processing, a client program is prepared. This client program is installed to the user terminal 20, and thereby the user terminal 20 can execute the processing of Steps S11 to S17. Just like the first program, the client program may be provided in the form of being recorded in a static manner on a tangible recording medium or may be provided through a communication network. The client program may be provided separately from another program.

Figure 4:
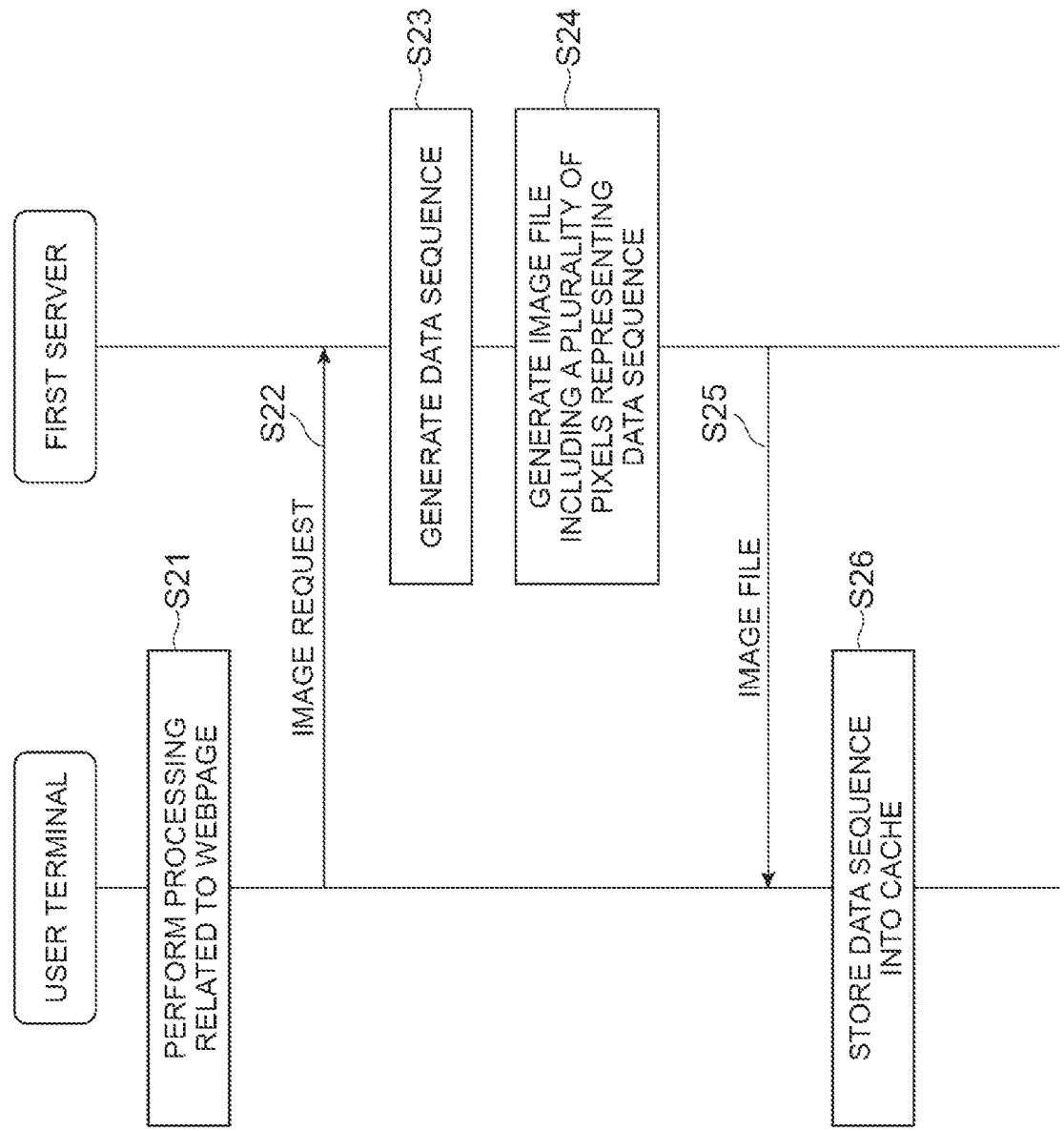
FIG. 4 is a sequence chart showing an example of the operation of the browser management system according to the first embodiment.

The operation of the browser management system 1 related to provision of the image file (data sequence) and a browser management method according to this embodiment are described hereinafter with reference to FIG. 4. FIG. 4 is a sequence chart showing an example of the operation of the browser management system 1. FIG. 4 is based on the assumption that the data sequence corresponding to the website to be displayed has not yet stored in the cache 22.

In Step S21, the user terminal 20 performs processing related to the webpage selected by the user. The "processing related to the webpage" is processing for displaying the webpage on the browser 21 of the user terminal 20, and it includes at least some of the above-described Steps S11 to S17.

In Step S22, the user terminal 20 transmits an image request to the first server 10. This processing is part of Step S14. The image request is a data signal for acquiring an image file from the first server 10. In the first server 10, the receiving unit 11 receives this image request.

In Step S23, the image generation unit 12 generates a data sequence for identifying the browser 21. To "identify the browser" means distinguishing and recognizing one browser from other browsers in one website. It should be noted that the data sequence is an identifier for identifying the browser 21, and it is not an identifier for identifying the user terminal 20. The data sequence is data represented by one character string composed of a plurality of characters processable by a computer. The image generation unit 12 generates the data sequence such that the data sequence includes the amount of information sufficient for identifying the browser 21 in the website. This amount of information may be represented by $2^n$ (i.e., n bits), and the amount of information of the data sequence increases as the exponent n is greater.

A specific value of the exponent n may be determined in any way as long as the browser 21 can be identified in one website. Further, the image generation unit 12 may generate the data sequence by using any method as long as the browser 21 can be identified in that way. The data sequence may be a value that is likely to be used again for another browser or the same browser in the future, or may be a unique value that is generated only once (i.e., a single-use value that is not likely to be used again for another browser or the same browser in the future). The structure of the data sequence is not limited. For example, the image generation unit 12 may generate the data sequence including at least one of a system time (for example, current date and time) and an IP address. For a more specific example, the data sequence may be generated by using a combination of an IP address of the first server 10, a thread ID indicating a thread that is running for the user terminal 20 in the first server 10, and a system time. Alternatively, the data sequence may be generated by using a combination of an IP address and a port number of the user terminal 20, an IP address and a port number of the first server 10, and a system time. Alternatively, the image generation unit 12 may generate the data sequence by using random numbers, auto-increment, or a sequence.

In Step S24, the image generation unit 12 generates an image file including a plurality of pixels representing the data sequence. To be specific, the image generation unit 12 generates the image file by converting the data sequence into a plurality of pixel values of a plurality of pixels. A color mode (a method of setting a color), the number of pixels, and a generation method of the image file are not limited, and the image generation unit 12 may generate the image file by using any method.

In an example, the image file may be represented by the RGB color space. In the case where a plurality of pixels are represented by RGB (red, green, and blue), the image generation unit 12 converts the data sequence into a plurality of pixel values (RGB values) of a plurality of pixels, and thereby represents this data sequence by a plurality of pixels and generates the image file including the plurality of pixels. Note that each pixel may be defined by another value in addition to the RGB values, and, for example, may be defined by further using an alpha value indicating transparency, which is used in Alpha Blending. Since the amount of information of each of the RGB colors is 8 bits, the amount of information of one pixel is $2^{(8\times 3)}$ (i.e., 24 bits). If the data sequence is converted into the RGB values of k number of pixels, the image generation unit 12 can embed the amount of information $2^{(8\times 3\times k)}$ in the k number of pixels.

In another example, the image file may be represented by Grayscale. In the case where a plurality of pixels are represented by Grayscale, the image generation unit 12 converts the data sequence into a plurality of pixel values (grayscale values) of a plurality of pixels and thereby represents this data sequence by a plurality of pixels, and generates an image file including the plurality of pixels. Since the amount of information of Grayscale is 8 bits, the amount of information of one pixel is $2^8$ (i.e., 8 bits). If the data sequence is converted into the grayscale values of k number of pixels, the image generation unit 12 may embed the amount of information $2^{(8\times k)}$ in the k number of pixels.

Since the amount of information of the data sequence is not limited as described above, the number of pixels in which the data sequence is to be embedded is also not limited. For example, when the data sequence is represented by 4 RGB pixels, the image generation unit 12 may generate an image file in which the data sequence with the amount of information $2^{(8\times 3\times 4)}=2^{96}$ (i.e., 96 bits) is embedded. When the data sequence is represented by 9 RGB pixels, the image generation unit 12 may generate an image file in which the data sequence with the amount of information $2^{(8\times 3\times 9)}=2^{216}$ (i.e., 216 bits) is embedded. When the data sequence is represented by 10 grayscale pixels, the image generation unit 12 may generate an image file in which the data sequence with the amount of information $2^{(8\times 10)}=2^{80}$ (i.e., 80 bits) is embedded. When the data sequence is represented by 16 grayscale pixels, the image generation unit 12 may generate an image file in which the data sequence with the amount of information $2^{(8\times 16)}=2^{128}$ (i.e., 128 bits) is embedded. The number k of pixels may be any number of 2 or more regardless of the type of the color mode of the image file, and it may be determined according to the amount of information of the data sequence.

The image generation unit 12 may generate the image file composed of a plurality of pixels in which the data sequence is embedded. Alternatively, the image generation unit 12 may generate the image file composed of a plurality of pixels in which the data sequence is embedded and one or more pixels in which the data sequence is not embedded. Specifically, the image generation unit 12 may generate the image file including another piece of information in addition to the data sequence.

The shape of the image file to be generated is not limited. For example, the shape of the image file may be square, rectangular, linear, substantially circular, or other polygonal shapes, or may be more complicated shapes. In the case of the image file of RGB colors, the image generation unit 12 may generate the image file of 2 (pixels)×2 (pixels) (the amount of information is 96 bits) or may generate the image file of 3 (pixels)×3 (pixels) (the amount of information is 216 bits).

In Step S25, the transmitting unit 13 transmits the image file to the user terminal 20. This image file is a response to the image request. The user terminal 20 receives this image file. This receiving processing is part of Step S14.

In Step S26, the user terminal 20 stores the data sequence into the cache 22. This processing corresponds to Step S15. The user terminal 20 may store the received image file into the cache 22 or store the data sequence extracted from the image file into the cache 22. Since the data sequence is embedded in the image file, storing of the image file into the cache 22 is one example of processing of storing the data sequence into the cache 22. When the user terminal 20 accesses the same website through the browser 21 after Step S26, the user terminal 20 may read the image file or the data sequence in the cache 22 and transmit this image file or data sequence to a specified server. In this processing, the user terminal 20 may extract the data sequence from the read image file. The server can execute stateful processing by storing or referring to the data sequence.

Second Embodiment

A browser management system 2 according to a second embodiment provides a framework for storing the data sequence generated in the first embodiment on the server side. This framework is an example of the configuration for implementing stateful processing on a computer system using a stateless protocol.

Figure 5:
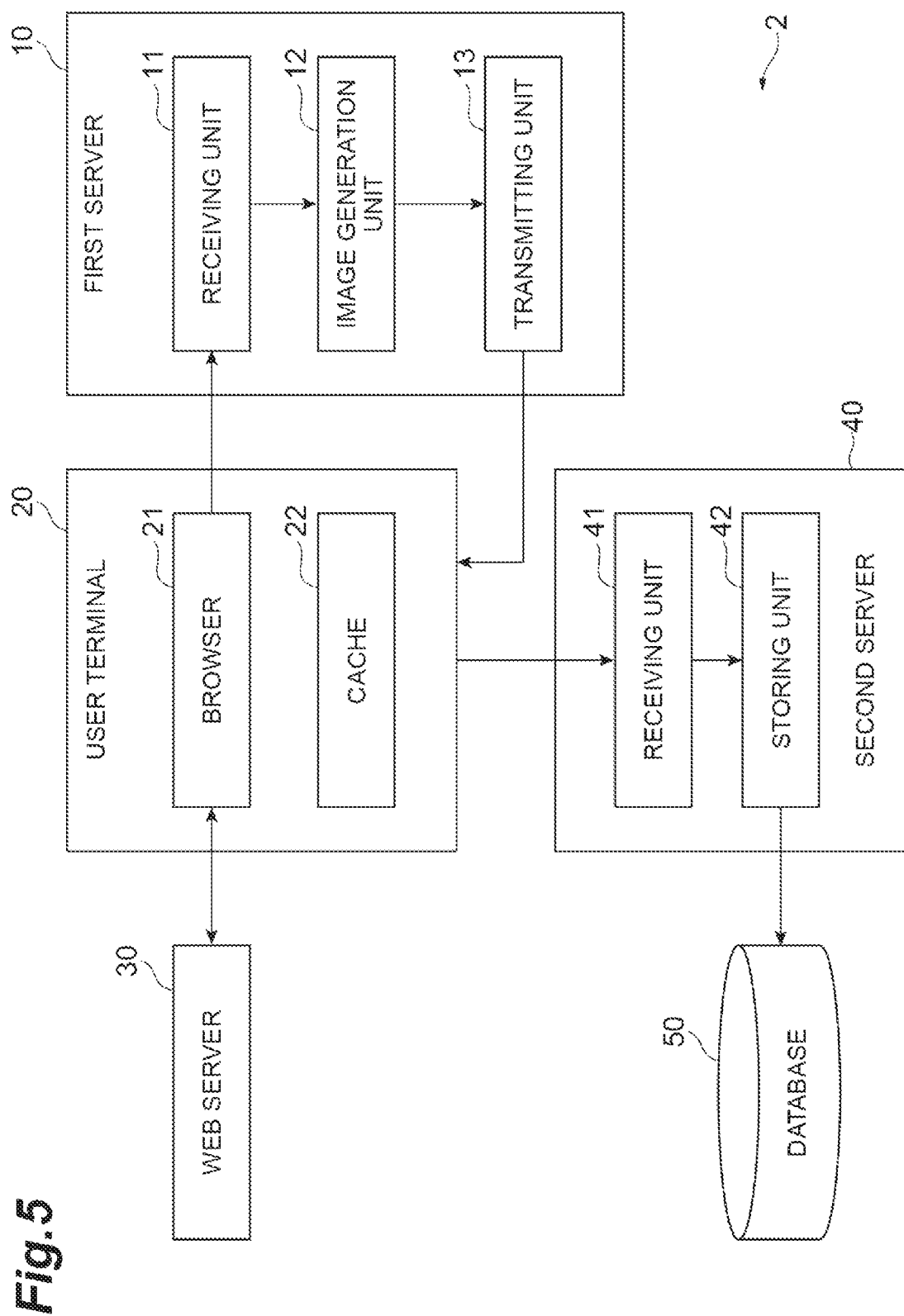
FIG. 5 is a view showing an example of the functional configuration of a browser management system according to a second embodiment.

FIG. 5 is a view showing an example of the functional configuration of the browser management system 2. In this embodiment, the browser management system 2 includes the first server 10, which is the same as that described in the first embodiment, and a second server 40 that stores the data sequence on the server side (network side). Just like the first server 10, the second server 40 is also a computer that performs processing for identifying the browser 21 of the user terminal 20. Each of the first server 10 and the second server 40 is connectable to one or more user terminals 20 through a communication network.

The second server 40 includes a receiving unit 41 and a storing unit 42 as functional elements. The receiving unit 41 is a functional element that receives a data sequence from the user terminal 20. The storing unit 42 is a functional element that stores this data sequence into a database 50. The second server 40 is also composed of one or a plurality of computers 100. In the case of using a plurality of computers, those computers are connected through a communication network such as the Internet or an intranet, and thereby logically one second server 40 is built. The computer 100 stores a second program causing at least one computer to function as the second server 40. The second program includes codes for implementing the functional elements of the second server 40. The functional elements of the second server 40 are implemented by loading the second program onto the processor 101 or the main storage unit 102 and running this program.

Just like the first program, the second program may be provided in the form of being recorded in a static manner on a tangible recording medium or may be provided through a communication network. The second program may be provided together with the first program, or may be provided separately from the first program.

The database 50 is a device that stores a data sequence. A method of implementing the database 50 is not limited, and it may be a relational database, for example. A location where the database 50 is placed is not limited and, for example, the database 50 may be one component of the browser management system 2, or may be placed in another computer system different from the browser management system 2. The database 50 may function as Key-Value Store (KVS) for storing and acquiring a value by using a key.

Although the second server 40 is a computer that is different from any of the first server 10 and the web server 30 in this embodiment, the configuration of the server is not limited thereto. For example, one server may include the functions of at least two servers of the first server 10, the second server 40, and the web server 30.

Figure 6:
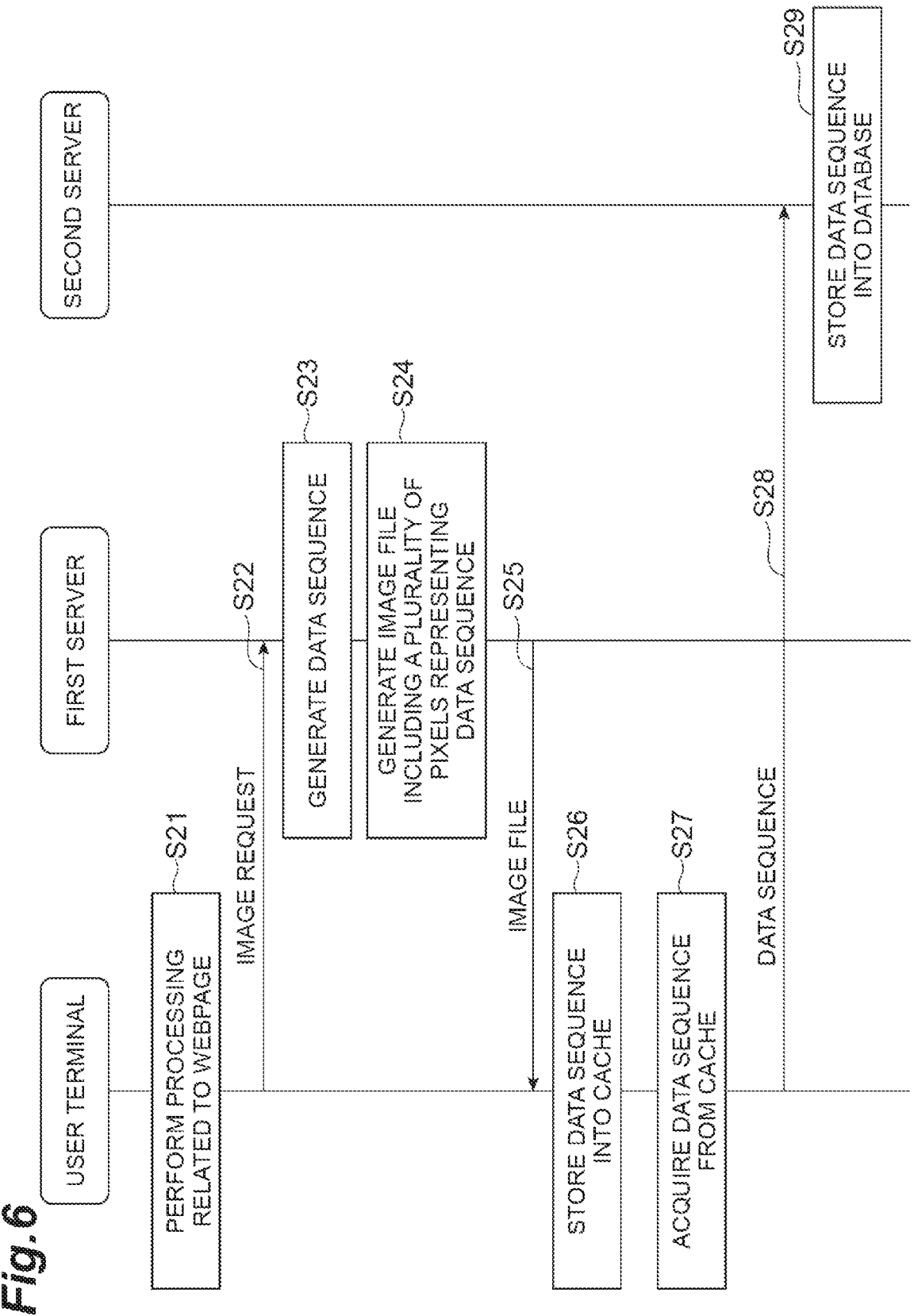
FIG. 6 is a sequence chart showing an example of the operation of the browser management system according to the second embodiment.

The operation of the browser management system 2 and a browser management method according to this embodiment are described hereinafter with reference to FIG. 6. FIG. 6 is a sequence chart showing an example of the operation of the browser management system 2.

The processing of Steps S21 to S26 in FIG. 6 is the same as that of the first embodiment (see FIG. 4), and therefore description of those steps is omitted.

In Step S27 subsequent to Step S26, the user terminal 20 acquires the data sequence from the cache 22. This processing may be executed by JavaScript (registered trademark) of the received webpage or may be executed upon occurrence of another system event.

A method of acquiring the data sequence is not limited. In the case where the cache 22 stores the image file, the user terminal 20 may read this image file from the cache 22. Since the data sequence is embedded in this image file, reading of the image file from the cache 22 is one example of processing of acquiring the data sequence from the cache 22. Alternatively, the user terminal 20 may acquire the data sequence by reading the image file from the cache 22 and extracting the data sequence from this image file. In the case where the cache 22 stores the data sequence, the user terminal 20 may acquire the data sequence by reading out this data sequence from the cache 22.

In Step S28, the user terminal 20 transmits the data sequence to the second server 40. A method of transmitting the data sequence is not limited. For example, the user terminal 20 may transmit the image file read out from the cache 22 to the second server 40. Since the data sequence is embedded in the image file, transmitting of the image file is one example of processing of transmitting the data sequence. Alternatively, the user terminal 20 may transmit the read or extracted data sequence to the second server 40. For example, the user terminal 20 may transmit a URL in which the data sequence is set to a URL parameter to the second server 40. In the second server 40, the receiving unit 41 receives this data sequence (which may be the image file).

In Step S29, the storing unit 42 stores this data sequence into the database 50. In the case where the receiving unit 41 receives the image file, the storing unit 42 may extract the data sequence from the image file and store this data sequence into the database 50. Alternatively, the storing unit 42 may store this image file into the database 50. Since the data sequence is embedded in the image file, storing of the image file is one example of processing of storing the data sequence. In the case where the receiving unit 41 receives the data sequence, the storing unit 42 may store this data sequence into the database 50. As a result that the data sequence is stored in the database 50, this data sequence can be referred to later on the serve side (network side). This enables execution of stateful processing. The storing unit 42 may generate a record by associating the data sequence with another arbitrary data item, and store this record into the database 50.

Third Embodiment

A browser management system 3 according to a third embodiment provides a framework for identifying a browser on the server side by using the data sequence generated and stored in the second embodiment. This framework is an example of the configuration for implementing stateful processing on a computer system using a stateless protocol.

Figure 7:
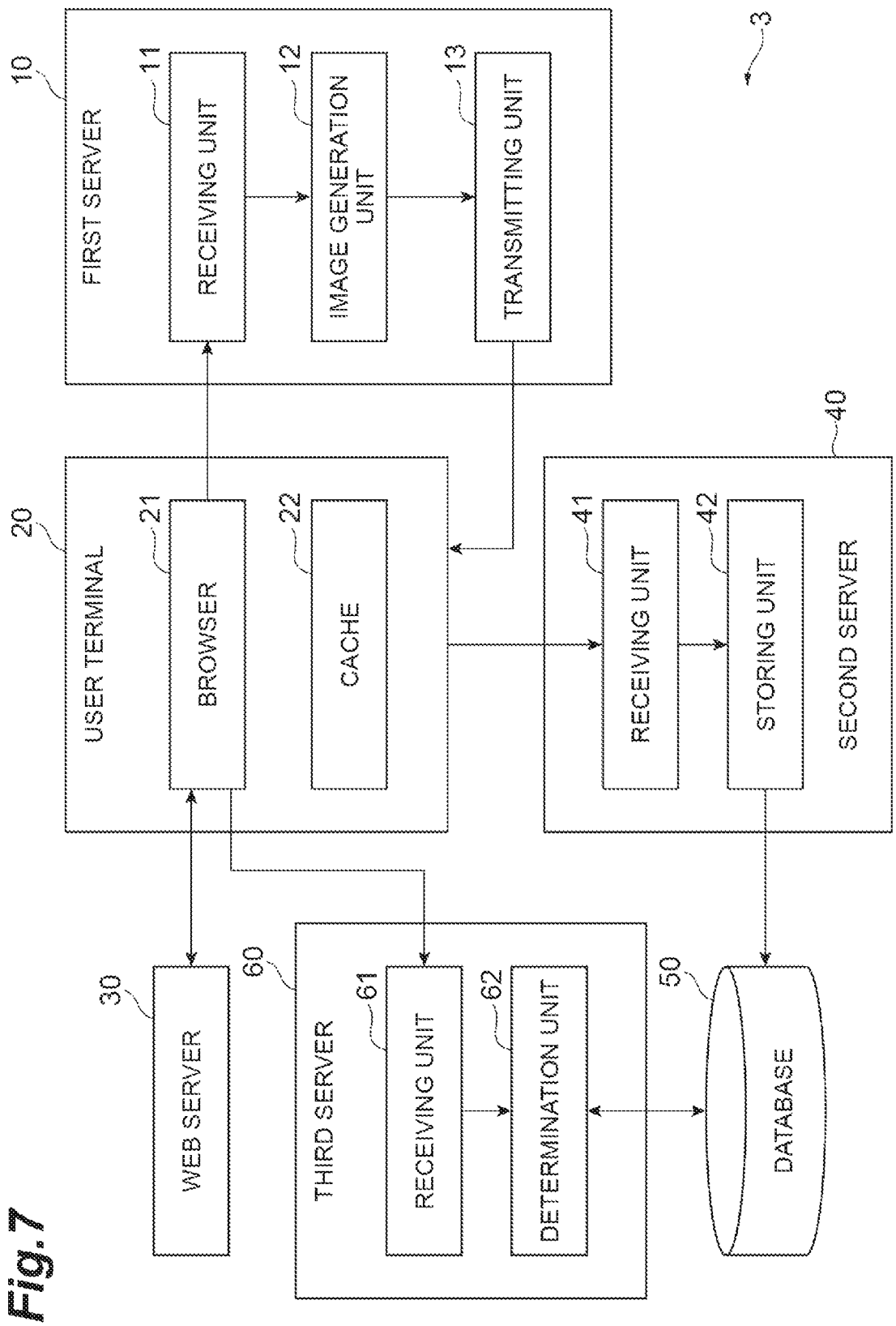
FIG. 7 is a view showing an example of the functional configuration of a browser management system according to a third embodiment.

FIG. 7 is a view showing an example of the functional configuration of the browser management system 3. In this embodiment, the browser management system 3 includes the first server 10 and the second server 40, which are the same as those described in the second embodiment, and a third server 60 that refers to the data sequence stored in the database 50. Just like the first server 10 and the second server 40, the third server 60 is also a computer that performs processing for identifying the browser 21 of the user terminal 20. Each of the first server 10, the second server 40 and the third server 60 is connectable to one or more user terminals 20 through a communication network.

The third server 60 includes a receiving unit 61 and a determination unit 62 as functional elements. The receiving unit 61 is a functional element that receives data that is to be processed (which is referred to hereinafter as "data to be processed") from the user terminal 20. The determination unit 62 is a functional element that identifies the browser 21 by comparing the data to be processed with the data sequence in the database 50. The third server 60 is also composed of one or a plurality of computers 100. In the case of using a plurality of computers, those computers are connected through a communication network such as the Internet or an intranet, and thereby logically one third server 60 is built. The computer 100 stores a third program causing at least one computer to function as the third server 60. The third program includes codes for implementing the functional elements of the third server 60. The functional elements of the third server 60 are implemented by loading the third program onto the processor 101 or the main storage unit 102 and running this program.

Just like the first program and the second program, the third program may be provided in the form of being recorded in a static manner on a tangible recording medium or may be provided through a communication network. The third program may be provided together with the first program and the second program, or may be provided separately from at least one of the first program and the second program.

Although the third server 60 is a computer that is different from any of the first server 10, the second server 40 and the web server 30 in this embodiment, the configuration of the server is not limited thereto. For example, one server may include the functions of at least two servers of the first server 10, the second server 40, the third server 60, and the web server 30.

Figure 8:
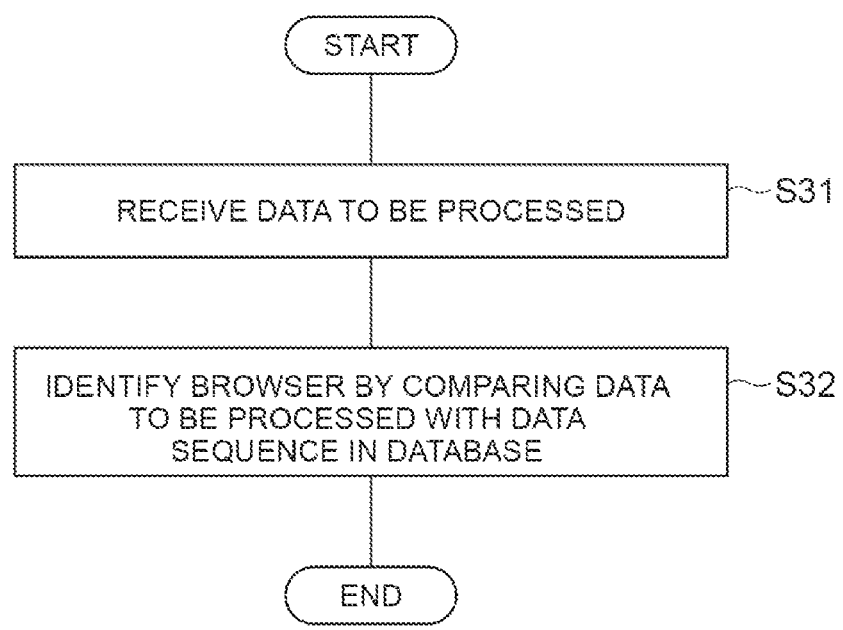
FIG. 8 is a flowchart showing an example of the operation of the browser management system according to the third embodiment.

The operation of the browser management system 3 and a browser management method according to this embodiment are described hereinafter with reference to FIG. 8. FIG. 8 is a flowchart showing an example of the operation of the third server 60. The browser management system 3 may execute the same processing (see FIG. 6) as the browser management system 2 (in the second embodiment), and consequently the data sequence is stored in the database 50. FIG. 8 shows processing when, after the data sequence of a certain browser 21 that has accessed a certain website is stored in the database 50, receiving the data to be processed from that browser 21.

In Step S31, the receiving unit 61 of the third server 60 acquires the data to be processed from the user terminal 20. The data to be processed may include the data sequence, and the specific content and structure of the data to be processed are not limited.

In Step S32, the determination unit 62 identifies the browser 21 by comparing the data to be processed with the data sequence in the database 50. The determination unit 62 determines whether the data to be processed includes the data sequence or not by comparing at least part of the data to be processed with one or more data sequences in the database 50. In the case where the database 50 stores the image file, the determination unit 62 extracts the data sequence from the image file and makes the comparison. When the data to be processed includes the data sequence existing in the database 50, the determination unit 62 determines that the data to be processed has been transmitted from the browser 21 corresponding to that data sequence. The determination unit 62 thereby identifies the browser 21 that has transmitted the data to be processed. When, on the other hand, the data to be processed does not include any of the data sequences in the database 50, the determination unit 62 determines that the sender of the data to be processed is unclear.

Processing after the browser 21 is identified by the determination unit 62 is not limited. The third server 60 may perform any processing after identifying the browser 21. Alternatively, after the third server 60 identifies the browser 21, another server such as the web server 30 may perform any processing. For example, after the browser 21 is identified, the third server 60 or another server may perform any processing for providing a stateful service.

Fourth Embodiment

A fourth embodiment is an example in which the browser management system according to the present disclosure is applied to affiliate tracking in voluntary chain (VC).

Figure 9:
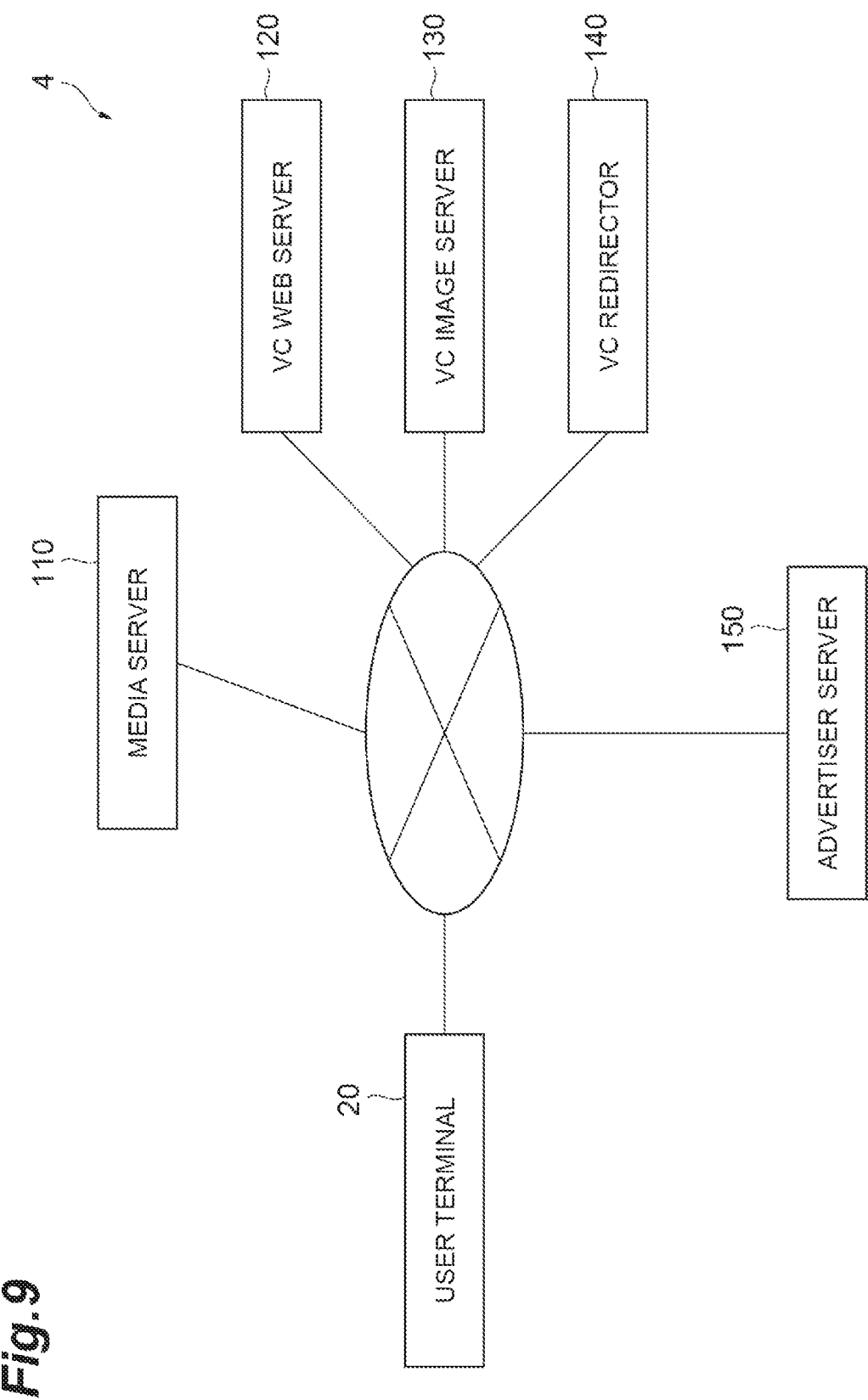
FIG. 9 is a view showing an example of application of a browser management system according to a fourth embodiment.
Figure 10:
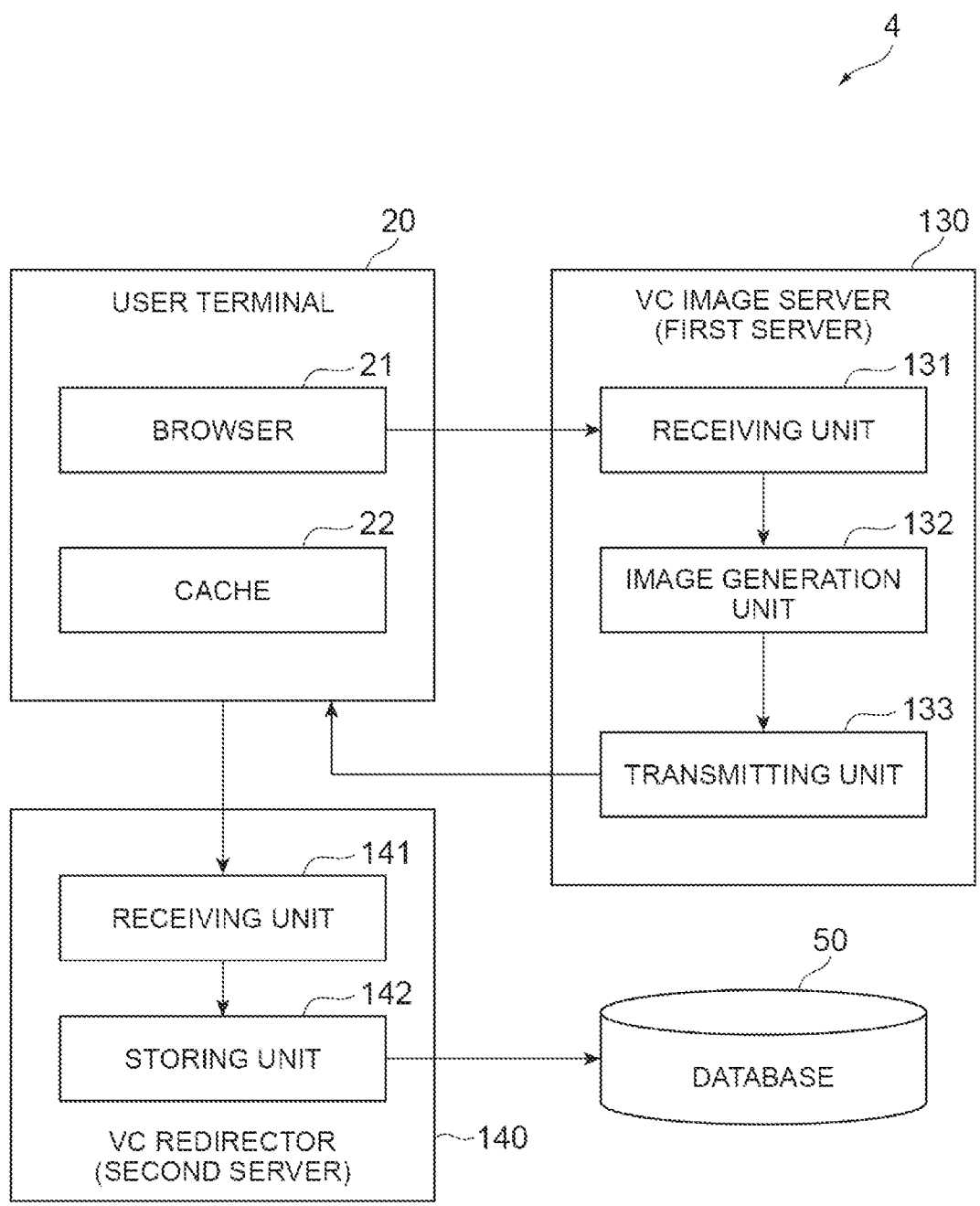
FIG. 10 is a view showing an example of the functional configuration of the browser management system according to the fourth embodiment.

A system configuration in the fourth embodiment is described hereinafter with reference to FIGS. 9 and 10. FIG. 9 is a view showing an example of application of a browser management system 4. FIG. 10 is a view showing an example of the functional configuration of the browser management system 4. In this embodiment, a server side (network side) includes a media server 110, a VC web server 120, a VC image server 130, a VC redirector 140, and an advertiser server 150. The user terminal 20 is connectable to each of those servers through a communication network (for example, the Internet).

The media server 110 is a computer that provides an advertising medium to the user terminal 20. The media server 110 transmits a webpage (advertising medium) including affiliate advertising to the user terminal 20 in response to a request from the user terminal 20. The affiliate advertising is advertising to be published on an advertising medium on the Internet, and it is a form of advertising in which compensation is paid to a media owner when a viewer (user) of this advertising medium purchases a product by being motivated by this advertisement. The advertising medium is a mediational means for communicating affiliate advertising to a viewer and, more specifically, it is a webpage on which any information appears. A style of affiliate advertising is not limited, and it may be banner advertising, for example.

The VC web server 120 is a web server of a voluntary chain, and it is a computer that provides a script for acquiring a data sequence. This script may be JavaScript (registered trademark), for example.

The VC image server 130 is a computer that transmits an image file in which a data sequence is embedded to the user terminal 20. The VC image server 130 is one example of the first server 10 in the first, second and third embodiments. The VC image server 130 includes a receiving unit 131, an image generation unit 132, and a transmitting unit 133 as functional elements. The receiving unit 131 is a functional element that receives a request for an image file from the user terminal 20 that performs processing for displaying a webpage. The image generation unit 132 is a functional element that generates an image file in response to that request. The transmitting unit 133 is a functional element that transmits the image file to the user terminal 20 in order to store the data sequence into the cache 22. The receiving unit 131, the image generation unit 132, and the transmitting unit 133 execute the same functions as the receiving unit 11, the image generation unit 12, and the transmitting unit 13, respectively, described above.

The VC redirector 140 is a computer that stores the data sequence on the serve side (network side). The VC redirector 140 is one example of the second server 40 in the second and third embodiments. The VC redirector 140 includes a receiving unit 141 and a storing unit 142 as functional elements. The receiving unit 141 is a functional element that receives a data sequence from the user terminal 20. The storing unit 142 is a functional element that stores the data sequence into a database 50. The receiving unit 141 and the storing unit 142 execute the same functions as the receiving unit 41 and the storing unit 42, respectively, in the second and third embodiments.

Thus, both of the VC image server 130 and the VC redirector 140 are computers that perform processing for identifying the browser 21 of the user terminal 20.

The advertiser server 150 is a computer that provides a user with a virtual shop run by an affiliate advertiser. A user who accesses a virtual shop by clicking on an affiliate advertising link can purchase a product at this virtual shop. A product is a given tangible or non-tangible object that may be traded at cost or at no cost, and it has the concept including provision of a service. The type of a product is not particularly limited.

Figure 11:
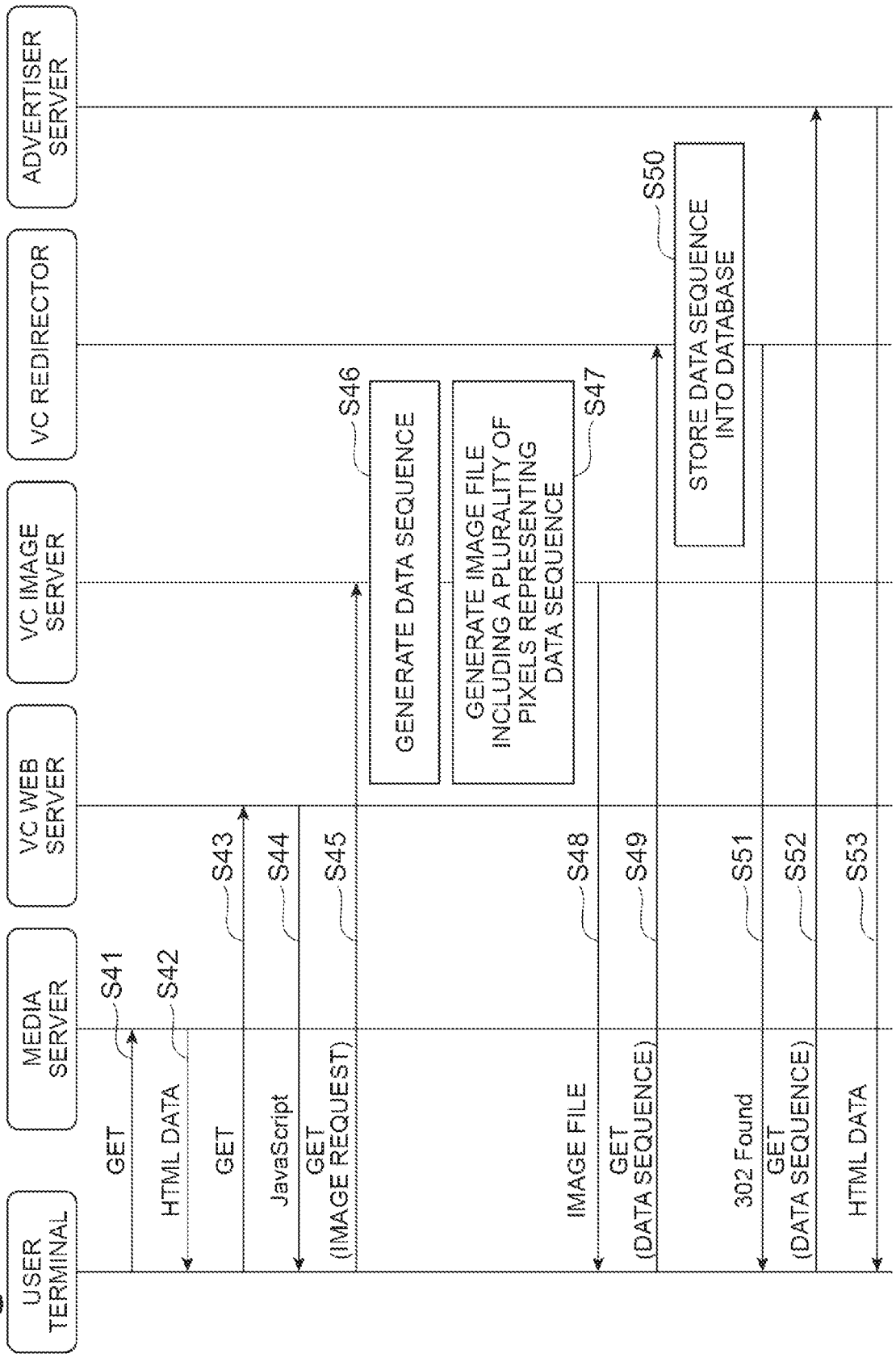
FIG. 11 is a sequence chart showing an example of the operation of the browser management system according to the fourth embodiment.

The operation of the browser management system 4 and a browser management method according to this embodiment are described hereinafter with reference to FIG. 11. FIG. 11 is a sequence chart showing an example of the operation of the browser management system 4.

In Step S41, the user terminal 20 transmits an HTTP request using a GET method to the media server 110.

In Step S42, the media server 110 transmits HTML data indicated by that request to the user terminal 20. This HTML data includes a <script> tag.

In Step S43, the user terminal 20 transmits an HTTP request (GET method) for acquiring JavaScript (registered trademark) indicated by that <script> tag, to the VC web server 120.

In Step S44, the VC web server 120 transmits JavaScript (registered trademark) to the user terminal 20 in response to that request.

In Step S45, the user terminal 20 executes that script and transmits an image request using the GET method to the VC image server 130. In the VC image server 130, the receiving unit 131 receives the image request. Step S45 corresponds to the above-described Step S22.

In Step S46, the image generation unit 132 of the VC image server 130 generates a data sequence for identifying the browser 21 of the user terminal 20. Step S46 corresponds to Step S23.

In Step S47, the image generation unit 132 generates an image file including a plurality of pixels representing the data sequence. Step S47 corresponds to Step S24.

In Step S48, the transmitting unit 133 of the VC image server 130 transmits this image file to the user terminal 20. Step S48 corresponds to Step S25.

The user terminal 20 receives this image file and stores the data sequence into the cache 22. This storing corresponds to Step S26. Thus, the user terminal 20 may store the image file or may store the data sequence extracted from the image file.

In Step S49, the user terminal 20 transmits an HTTP request including the data sequence to the VC redirector 140 by using the GET method. Step S49 corresponds to Step S28. Thus, the user terminal 20 may transmit the image file or may transmit the data sequence extracted from the image file. In the VC redirector 140, the receiving unit 141 receives this data sequence.

In Step S50, the storing unit 142 of the VC redirector 140 stores the data sequence into the database 50. Step S50 corresponds to Step S29. Thus, the storing unit 142 may store the image file, or may store the received data sequence or the data sequence extracted from the image file.

The storing unit 142 may generate a record by associating the data sequence with another data item and store this record into the database 50. For example, the storing unit 142 may add at least one of a user ID, a media owner ID, an advertiser ID, and a tracking key to the record. By this record, at least one of a user ID, a media owner ID, an advertiser ID, and a tracking key is associated with the data sequence. The user ID is an identifier for uniquely identifying a user. The media owner ID is an identifier for uniquely identifying a media owner who places an advertising medium. The advertiser ID is an identifier for uniquely identifying an affiliate advertiser. The tracking key is an identifier that is used for tracking a user's operation in a specific website.

In Step S51, the VC redirector 140 transmits "302 Found", which is an HTTP status code for redirect, to the user terminal 20. The user terminal 20 receives this data signal.

In Step S52, in response to this "302 Found", the user terminal 20 reads out the data sequence from the cache 22, and transmits a request (GET method) including this data sequence to the advertiser server 150.

In Step S53, in response to that request, the advertiser server 150 transmits the specified HTML data to the user terminal 20. This advertiser server 150 can execute stateful processing based on the condition that the data sequence received in Step S52 is already stored in the database 50.

Fifth Embodiment

A fifth embodiment is an example in which the browser management system according to the present disclosure is applied to analytics. The analytics is a technique of analyzing which website a user has accessed from or what route a user follows in a website.

Figure 12:
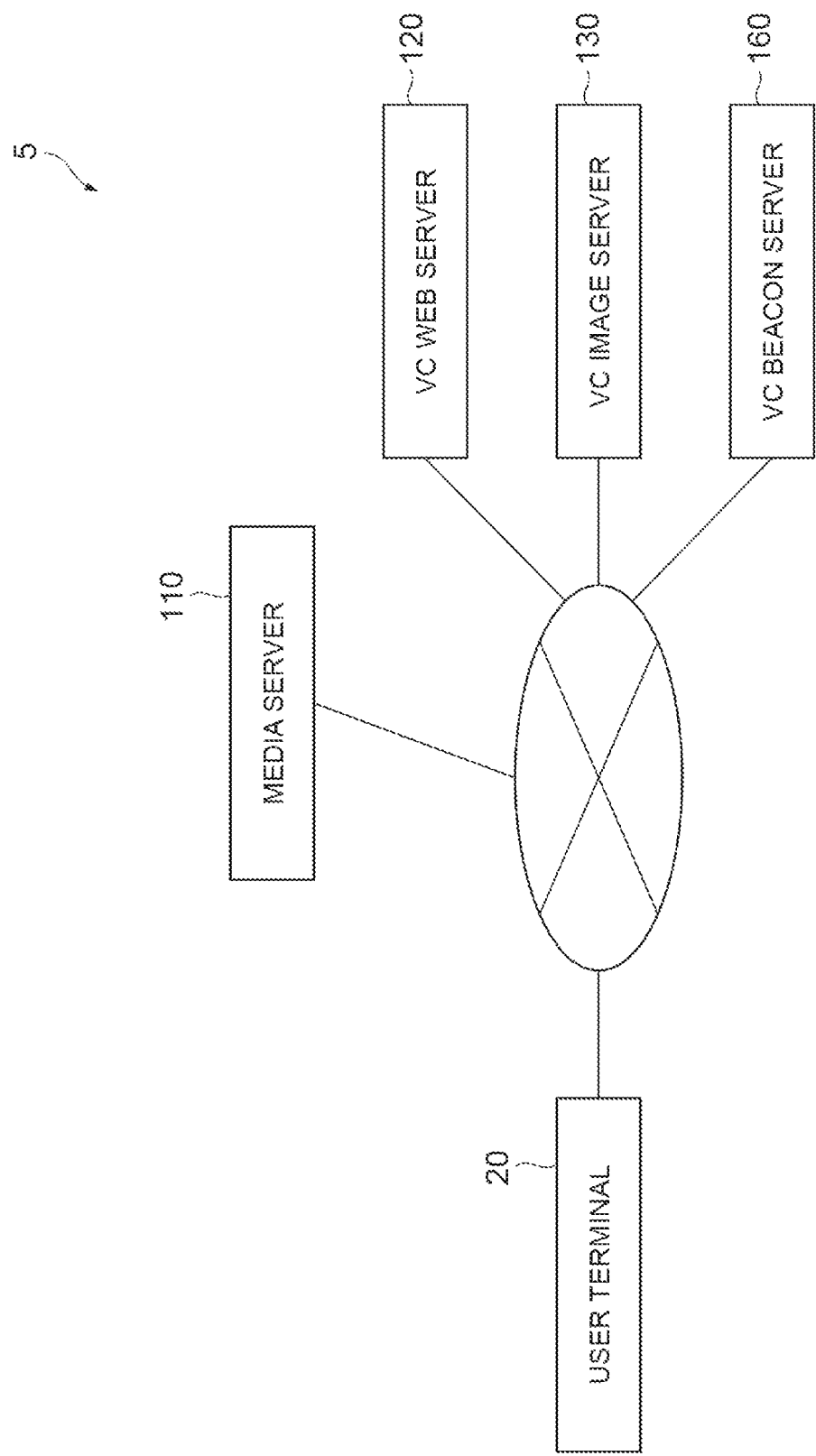
FIG. 12 is a view showing an example of application of a browser management system according to a fifth embodiment.
Figure 13:
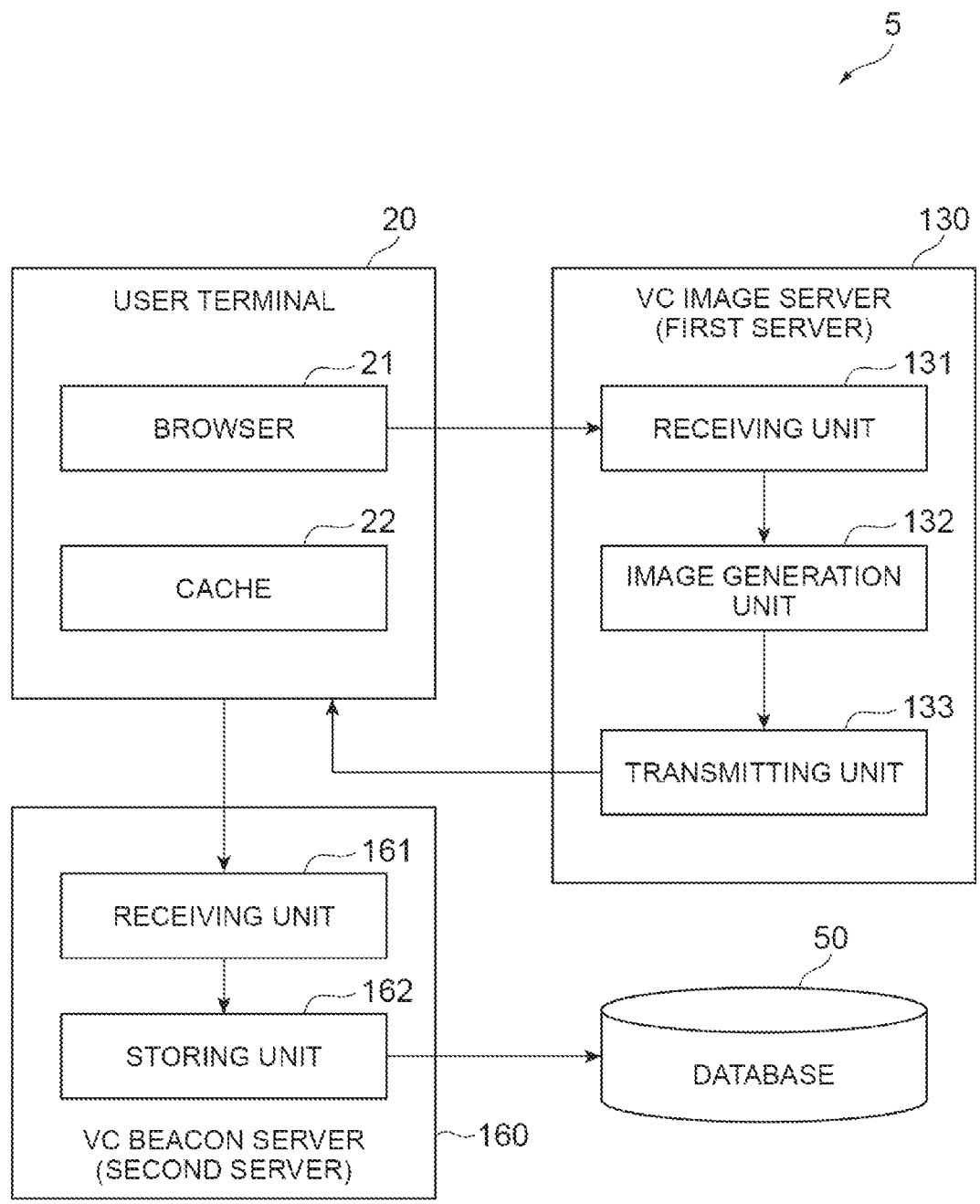
FIG. 13 is a view showing an example of the functional configuration of the browser management system according to the fifth embodiment.

A system configuration in the fifth embodiment is described hereinafter with reference to FIGS. 12 and 13. FIG. 12 is a view showing an example of application of a browser management system 5. FIG. 13 is a view showing an example of the functional configuration of the browser management system 5. In this embodiment, a server side (network side) includes a media server 110, a VC web server 120, a VC image server 130, and a VC beacon server 160. The user terminal 20 is connectable to each of those servers through a communication network (for example, the Internet).

The configurations of the media server 110, the VC web server 120, and the VC image server 130 are the same as those of the fourth embodiment.

The VC beacon server 160 is a computer that stores the data sequence on the serve side (network side). The VC beacon server 160 is one example of the second server 40 in the second and third embodiments. The VC beacon server 160 includes a receiving unit 161 and a storing unit 162 as functional elements. The receiving unit 161 is a functional element that receives a data sequence from the user terminal 20. The storing unit 162 is a functional element that stores the data sequence into a database 50. The receiving unit 161 and the storing unit 162 execute the same functions as the receiving unit 41 and the storing unit 42, respectively, described above.

Thus, the VC image server 130 and the VC beacon server 160 are computers that perform processing for identifying the browser 21 of the user terminal 20.

Figure 14:
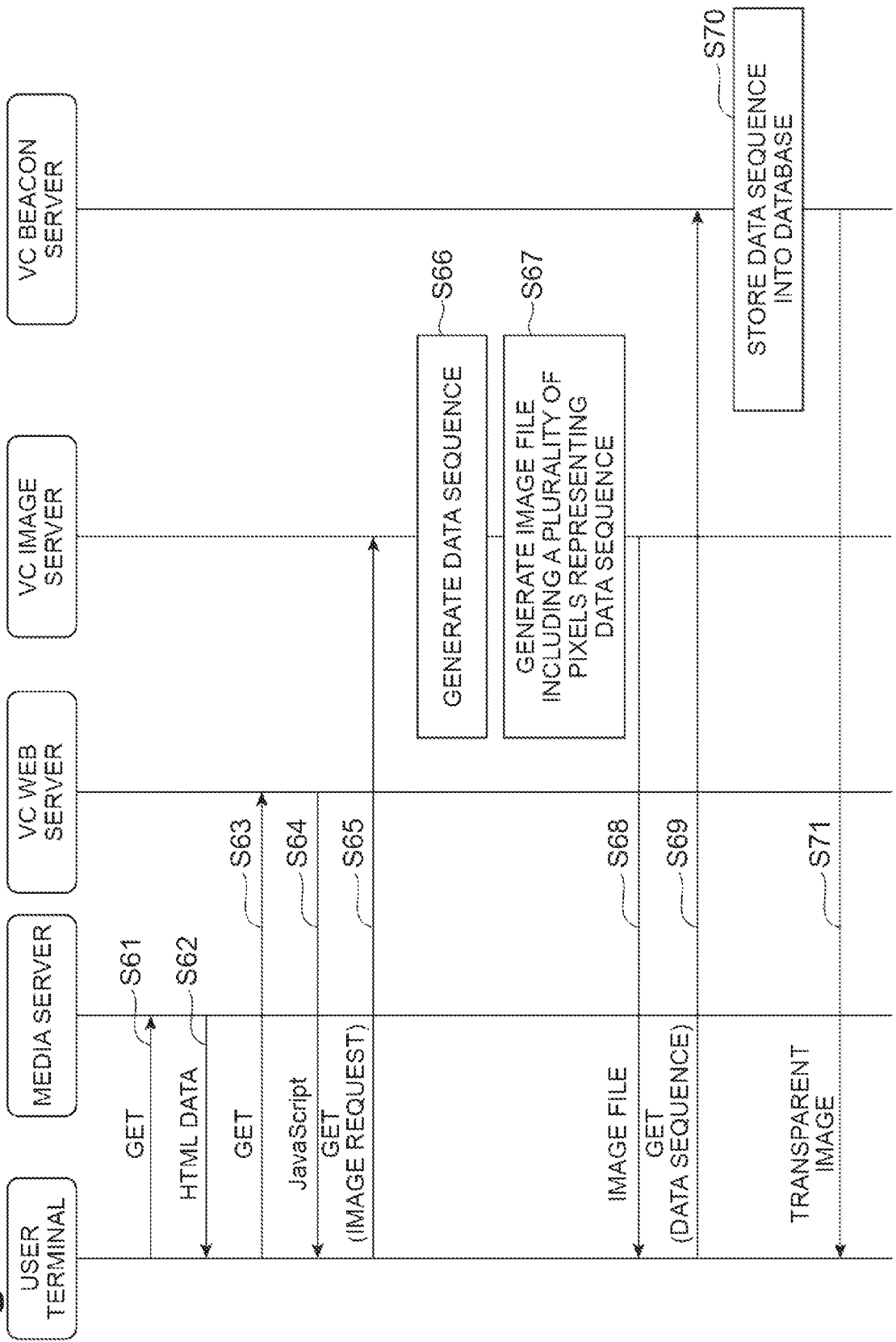
FIG. 14 is a sequence chart showing an example of the operation of the browser management system according to the fifth embodiment.

The operation of the browser management system 5 and a browser management method according to this embodiment are described hereinafter with reference to FIG. 14. FIG. 14 is a sequence chart showing an example of the operation of the browser management system 5.

The processing of Steps S61 to S68 is the same as the processing of Steps S41 to S48 in the fifth embodiment. The user terminal 20 receives the image file transmitted from the VC image server 130 in Step S68 and stores the data sequence into the cache 22. The user terminal 20 may store the image file or may store the data sequence extracted from the image file.

In Step S69, the user terminal 20 transmits an HTTP request including that data sequence to the VC beacon server 160 by using the GET method. Step S69 corresponds to Step S28 in the second embodiment. Thus, the user terminal 20 may transmit the image file or may transmit the data sequence extracted from the image file. In the VC beacon server 160, the receiving unit 161 receives this data sequence.

In Step S70, the storing unit 162 of the VC beacon server 160 stores the data sequence into the database 50. Step S70 corresponds to Step S29. Thus, the storing unit 162 may store the image file, or may store the received data sequence or the data sequence extracted from the image file. Just like in the fourth embodiment, the storing unit 162 may generate a record by associating the data sequence with another data item and store this record into the database 50. For example, the storing unit 162 may add at least one of a user ID, a media owner ID, an advertiser ID, and a tracking key to the record.

In Step S71, the VC beacon server 160 transmits a transparent image to be used for analytics to the user terminal 20. The user terminal 20 receives the transparent image. It should be noted that this transparent image is a different image from the image file in which the data sequence for identifying the browser 21 is embedded.

Sixth Embodiment

A sixth embodiment is an example in which the browser management system according to the present disclosure is applied to targeting. The targeting is a technique of tracking which website a user has accessed on the Internet.

Figure 15:
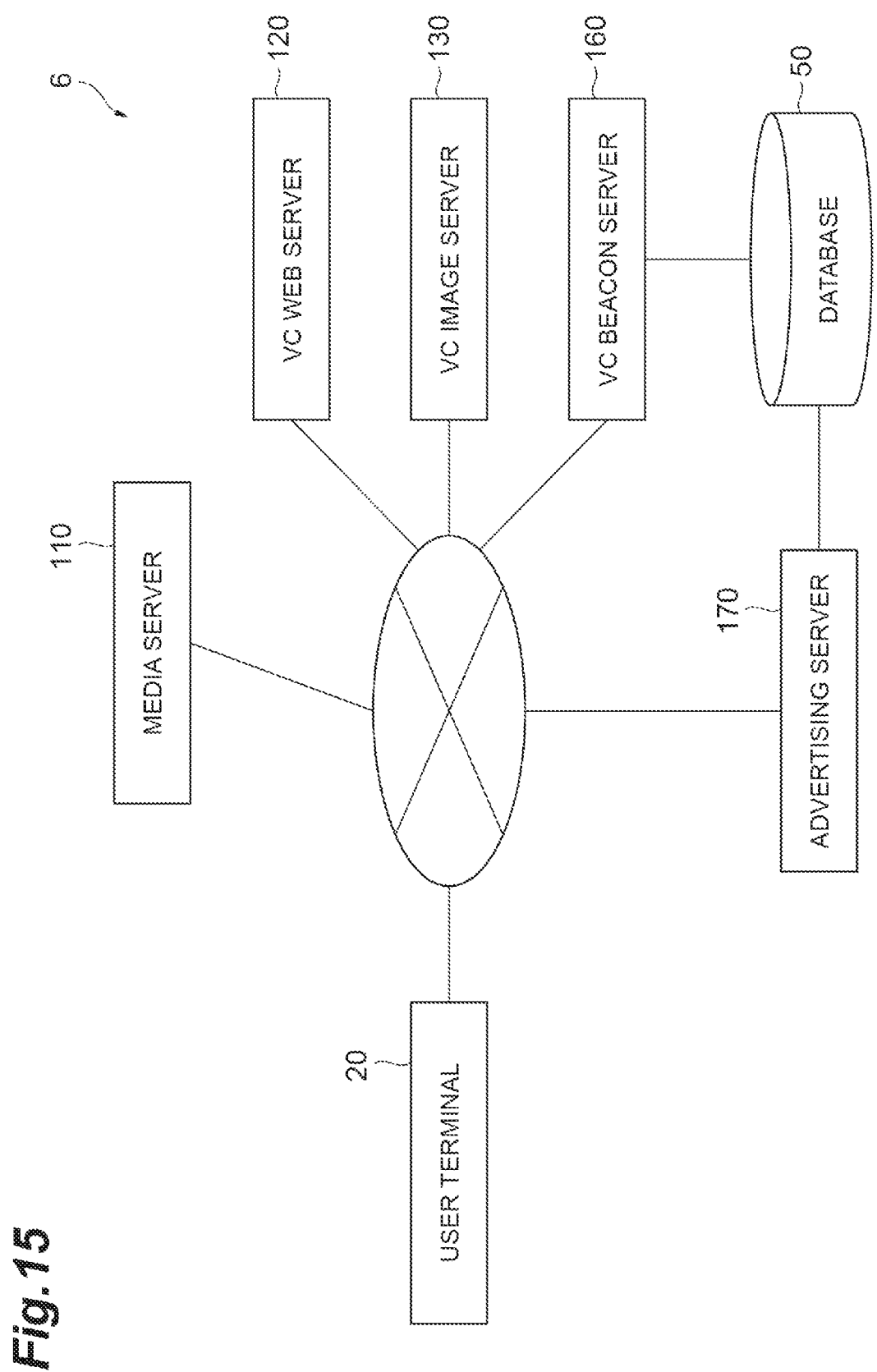
FIG. 15 is a view showing an example of application of a browser management system according to a sixth embodiment.
Figure 16:
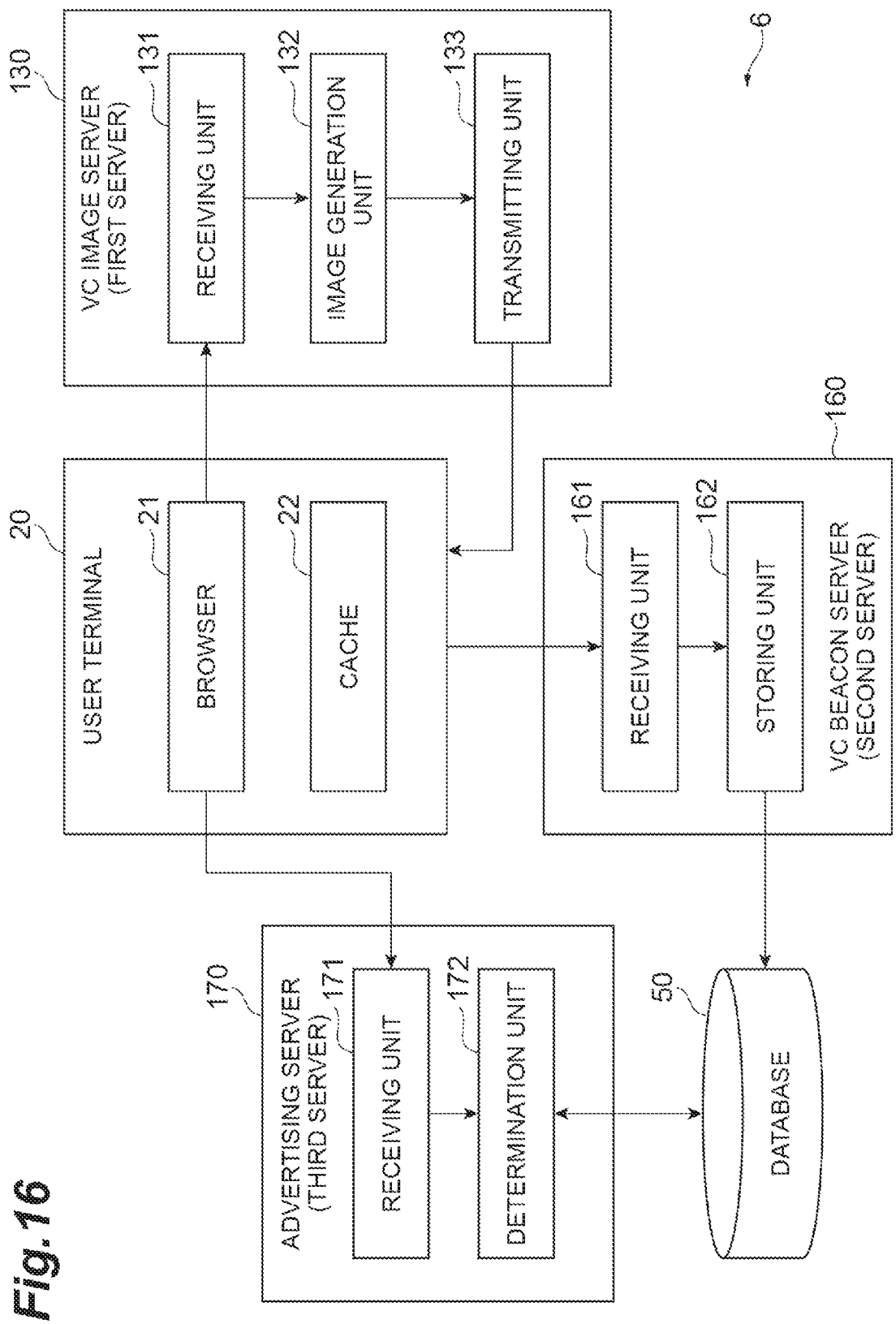
FIG. 16 is a view showing an example of the functional configuration of the browser management system according to the sixth embodiment.

A system configuration in the sixth embodiment is described hereinafter with reference to FIGS. 15 and 16. FIG. 15 is a view showing an example of application of a browser management system 6. FIG. 16 is a view showing an example of the functional configuration of the browser management system 6. In this embodiment, a server side (network side) includes a media server 110, a VC web server 120, a VC image server 130, a VC beacon server 160, and an advertising server 170. The user terminal 20 is connectable to each of those servers through a communication network (for example, the Internet).

The configurations of the media server 110, the VC web server 120, the VC image server 130, and the VC beacon server 160 are the same as those of the fifth embodiment.

The advertising server 170 is a computer that provides a user with affiliate advertising to be placed on an advertising medium. The advertising server 170 may perform processing of comparing the data to be processed that is transmitted from the browser 21 with the data sequence that is stored in the database 50 and identifying the browser 21. Thus, the advertising server 170 is one example of the third server 60 in the third embodiment. The advertising server 170 includes a receiving unit 171 and a determination unit 172 as functional elements. The receiving unit 171 is a functional element that receives data to be processed from the user terminal 20. The determination unit 172 is a functional element that identifies the browser 21 by comparing the data to be processed with the data sequence in the database 50. The receiving unit 171 and the determination unit 172 execute the same functions as the receiving unit 61 and the determination unit 62, respectively, described above.

Thus, all of the VC image server 130, the VC beacon server 160, and the advertising server 170 are computers that perform processing for identifying the browser 21 of the user terminal 20.

Figure 17:
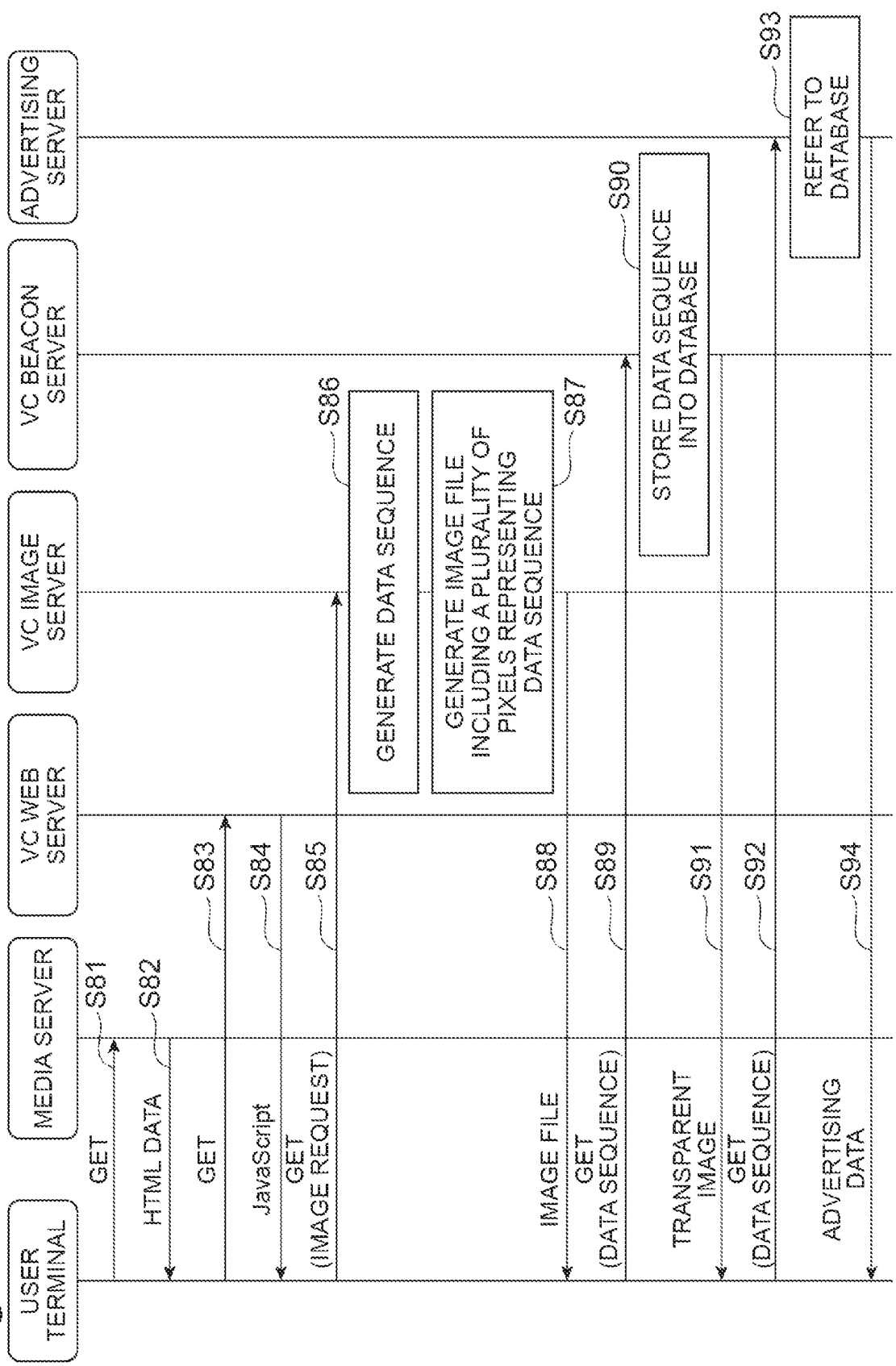
FIG. 17 is a sequence chart showing an example of the operation of the browser management system according to the sixth embodiment.

The operation of the browser management system 6 and a browser management method according to this embodiment are described hereinafter with reference to FIG. 17. FIG. 17 is a sequence chart showing an example of the operation of the browser management system 6.

The processing of Steps S81 to S91 is the same as the processing of Steps S61 to S71 in the fifth embodiment.

In Step S92, the user terminal 20 transmits an HTTP request (GET method) for acquiring affiliate advertising to the advertising server 170. This request includes the data sequence read from the cache 22. In the advertising server 170, the receiving unit 171 receives this request. This receiving corresponding to Step S31, and therefore the HTTP request corresponds to the data to be processed.

In Step S93, the determination unit 172 of the advertising server 170 refers to the database 50 based on that request, and thereby determines whether the same data sequence as the one included in the request is stored in the database 50. The determination unit 172 may identify the browser 21 based on the determination result. Step S93 corresponds to Step S32. The advertising server 170 can perform further processing (this processing is stateful processing) required for targeting based on the determination result.

In Step S94, in response to that request, the advertising server 170 transmits data of specified affiliate advertising (advertising data) to the user terminal 20. The user terminal 20 receives this advertising data and displays an advertising medium including affiliate advertising on a monitor.

In the fourth, fifth and sixth embodiments, the user terminal 20 transmits an HTTP request by using the GET method. However, use of the GET method is not essential, and the user terminal 20 may use another HTTP request method (for example, a POST method).

Advantageous Effects

As described above, a browser management system according to one aspect of the present invention includes at least one processor, the at least one processor is configured to: in response to processing for displaying a webpage on a browser of a user terminal, generate a data sequence for identifying the browser; generate an image file including a plurality of pixels representing the data sequence; and transmit the image file to the user terminal in order to store the data sequence into a cache of the user terminal.

A browser management method according to one aspect of the present invention is a browser management method performed by at least one processor, including: in response to processing for displaying a webpage on a browser of a user terminal, generating a data sequence for identifying the browser; generating an image file including a plurality of pixels representing the data sequence; and transmitting the image file to the user terminal in order to store the data sequence into a cache of the user terminal.

A browser management program according to one aspect of the present invention causes a computer system to perform: in response to processing for displaying a webpage on a browser of a user terminal, generating a data sequence for identifying the browser; generating an image file including a plurality of pixels representing the data sequence; and transmitting the image file to the user terminal in order to store the data sequence into a cache of the user terminal.

In the above-described aspects, the image file representing the data sequence for identifying a browser is stored in the cache of the user terminal. Thus, by using this image file, the browser can be identified without using an HTTP cookie. Further, by embedding the data sequence for identifying a browser in the image file, which has been widely used, this data sequence can be stored into the cache in a form not dependent on a specific service, and this data sequence can be read from the cache according to need. Therefore, this novel technique that serves as an alternative to an HTTP cookie is applicable to various online services. In other words, this novel technique that embeds the data sequence in the image file is high in versatility.

In a browser management system according to another aspect, the at least one processor may be further configured to generate the image file by converting the data sequence into a plurality of pixel values corresponding to the plurality of pixels. By converting the data sequence into pixel values, the data sequence can be efficiently embedded in the image file.

In a browser management system according to another aspect, the plurality of pixels may be represented by RGB or Grayscale. By converting the data sequence into RGB or grayscale pixel values, the data sequence can be efficiently embedded in the image file.

In a browser management system according to another aspect, the webpage may include a script for acquiring the image file, and the at least one processor may be further configured to perform the generation of the data sequence, the generation of the image file, and the transmission of the image file in response to execution of the script in the user terminal. By generating and transmitting the image file according to the script in the webpage, the image file can be provided to the user terminal at the timing when the data sequence is needed.

In a browser management system according to another aspect, the at least one processor may be further configured to acquire the data sequence read from the cache and transmitted by the user terminal. By acquiring the data sequence stored in the cache of the user terminal, this data sequence can be stored on the server side, and the browser can be identified by using this stored data sequence.

In a browser management system according to another aspect, the at least one processor may be further configured to acquire the data sequence by receiving a character string including the data sequence from the user terminal. In this case, there is no need to extract the data sequence from the image file on the server side, and the processing load on the server side is thereby reduced.

In a browser management system according to another aspect, the at least one processor may be further configured to acquire the data sequence by receiving the image file from the user terminal and extracting the data sequence from the image file. In this case, there is no need to extract the data sequence from the image file in the user terminal, and the processing load on the user terminal is thereby reduced.

In a browser management system according to another aspect, the at least one processor may be further configured to store the acquired data sequence into a storage device. By storing the data sequence on the server side, the browser can be identified by using this stored data sequence.

In a browser management system according to another aspect, the at least one processor is further configured to: acquire data to be processed from the user terminal after the data sequence is stored into the storage device; compare the data to be processed with the data sequence in the storage device; and when the data to be processed includes the data sequence, determine that the data to be processed is transmitted from the browser. The browser can be identified by checking the data (data to be processed) transmitted from the user terminal with the data sequence in the storage device.

A browser management program according to another aspect causes a computer to perform: receiving the image file from the browser management system according to any one of the systems described above; and storing the data sequence into the cache. In this aspect, the data sequence for identifying a browser is stored in the cache of the user terminal. Thus, by using this data sequence, the browser can be identified without using an HTTP cookie.

MODIFIED EXAMPLE

Embodiments of the present invention is described in detail above. However, the present invention is not limited to the above-described embodiments. Various changes and modifications may be made to the present invention without departing from the scope of the disclosure.

The configuration of the browser management system is not limited to the above-described embodiments, and the browser management system may be configured using one or more arbitrary servers. In any case, the browser management system includes at least one processor. In the case where the browser management system includes a plurality of processors, a processor that performs the first processing may be the same as or different from a processor that performs the second processing. "At least one processor performs the first processing and the second processing" means that a processor to perform certain processing is not particularly limited to a certain processor.

Although the database 50 stores the data sequence in the above-described several embodiments, the storage device is not limited to the database 50. The browser management system may store the data sequence into a storage device (for example, any type of memory) different from the database.

Further, a procedure of the browser management method that is performed by at least one processor is not limited to the example shown in the above-described embodiments. For example, some of the above-described steps (processing) may be omitted, or the steps may be carried out in a different order. Further, any two or more steps of the above-described steps may be combined, or some of the steps may be modified or eliminated. Alternatively, another step may be performed in addition to the above-described steps.

REFERENCE SIGNS LIST 1-6 . . . BROWSER MANAGEMENT SYSTEM, 10 . . . FIRST SERVER, 11 . . . RECEIVING UNIT, 12 . . . IMAGE GENERATION UNIT, 13 . . . TRANSMITTING UNIT, 20 . . . USER TERMINAL, 21 . . . BROWSER, 22 . . . CACHE, 30 . . . WEB SERVER, 40 . . . SECOND SERVER, 41 . . . RECEIVING UNIT, 42 . . . STORING UNIT, 50 . . . DATABASE (STORAGE DEVICE), 60 . . . THIRD SERVER, 61 . . . RECEIVING UNIT, 62 . . . DETERMINATION UNIT, 110 . . . MEDIA SERVER, 120 . . . VC WEB SERVER, 130 . . . VC IMAGE SERVER, 131 . . . RECEIVING UNIT, 132 . . . IMAGE GENERATION UNIT, 133 . . . TRANSMITTING UNIT, 140 . . . VC REDIRECTOR, 141 . . . RECEIVING UNIT, 142 . . . STORING UNIT, 150 . . . ADVERTISER SERVER, 160 . . . VC BEACON SERVER, 161 . . . RECEIVING UNIT, 162 . . . STORING UNIT, 170 . . . ADVERTISING SERVER, 171 . . . RECEIVING UNIT, 172 . . . DETERMINATION UNIT.

The invention claimed is:

1. A browser management system comprising:
at least one processor, wherein
the at least one processor is configured to:
in response to processing for displaying a webpage on a browser of a user terminal, generate a data sequence that is an identifier for identifying the browser;
generate an image file including a plurality of pixels representing the data sequence;
transmit the image file to the user terminal in order to store the data sequence into a cache of the user terminal;
acquire the data sequence read from the cache and transmitted by the user terminal, and store the acquired data sequence into a storage device;
acquire data to be processed from the user terminal after the data sequence is stored into the storage device;
compare the data to be processed with the data sequence in the storage device;
in a case where the data to be processed includes the data sequence, determine that the data to be processed is transmitted from the browser, and identify the browser; and
perform a stateful processing based on a current state of the identified browser, without using an HTTP cookie.

2. The browser management system according to claim 1, wherein the at least one processor is further configured to generate the image file by converting the data sequence into a plurality of pixel values corresponding to the plurality of pixels.

3. The browser management system according to claim 1 wherein the plurality of pixels are represented by RGB or Grayscale.

4. The browser management system according to claim 1, wherein
  the webpage includes a script for acquiring the image file, and
  the at least one processor is further configured to perform the generation of the data sequence, the generation of the image file, and the transmission of the image file in response to execution of the script in the user terminal.

5. The browser management system according to claim 1, wherein the at least one processor is further configured to acquire the data sequence by receiving a character string including the data sequence from the user terminal.

6. The browser management system according to claim 1, wherein the at least one processor is further configured to acquire the data sequence by receiving the image file from the user terminal and extracting the data sequence from the image file.

7. A browser management method performed by at least one processor, comprising:
  in response to processing for displaying a webpage on a browser of a user terminal, generating a data sequence that is an identifier for identifying the browser;
  generating an image file including a plurality of pixels representing the data sequence; and
  transmitting the image file to the user terminal in order to store the data sequence into a cache of the user terminal;
  acquiring the data sequence read from the cache and transmitted by the user terminal, and storing the acquired data sequence into a storage device;
  acquiring data to be processed from the user terminal after the data sequence is stored into the storage device;
  comparing the data to be processed with the data sequence in the storage device;
  in a case where the data to be processed includes the data sequence, determining that the data to be processed is transmitted from the browser, and identifying the browser; and
  performing a stateful processing based on a current state of the identified browser, without using an HTTP cookie.

8. A non-transitory computer-readable storage medium storing a browser management program causing a computer system to perform:
  in response to processing for displaying a webpage on a browser of a user terminal, generating a data sequence that is an identifier for identifying the browser;
  generating an image file including a plurality of pixels representing the data sequence; and
  transmitting the image file to the user terminal in order to store the data sequence into a cache of the user terminal;
  acquiring the data sequence read from the cache and transmitted by the user terminal, and storing the acquired data sequence into a storage device;
  acquiring data to be processed from the user terminal after the data sequence is stored into the storage device;
  comparing the data to be processed with the data sequence in the storage device;
  in a case where the data to be processed includes the data sequence, determining that the data to be processed is transmitted from the browser, and identifying the browser; and
  performing a stateful processing based on a current state of the identified browser, without using an HTTP cookie.

* * * * *